United States Patent
Saidi et al.

(10) Patent No.: US 8,318,352 B2
(45) Date of Patent: Nov. 27, 2012

(54) BATTERIES COMPRISING ALKALI-TRANSITION METAL PHOSPHATES AND PREFERRED ELECTROLYTES

(75) Inventors: M. Yazid Saidi, Henderson, NV (US); Haitao Huang, Henderson, NV (US); James K. Pugh, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 2689 days.

(21) Appl. No.: 11/080,605

(22) Filed: Mar. 15, 2005

(65) Prior Publication Data

US 2005/0181283 A1 Aug. 18, 2005

Related U.S. Application Data

(62) Division of application No. 10/116,276, filed on Apr. 3, 2002, now abandoned.

(51) Int. Cl.
*H01M 4/52* (2010.01)
(52) U.S. Cl. .................. 429/231.3; 429/231.6; 429/221
(58) Field of Classification Search .............. 429/231.3, 429/231.6, 221
See application file for complete search history.

(56) References Cited

U.S. PATENT DOCUMENTS

| | | | |
|---|---|---|---|
| 4,049,891 A | 9/1977 | Hong et al. |
| 4,194,062 A | 3/1980 | Carides et al. |
| 4,464,447 A | 8/1984 | Lazzari et al. |
| 4,477,541 A | 10/1984 | Fraioli |
| 4,668,595 A | 5/1987 | Yoshino et al. |
| 4,792,504 A | 12/1988 | Schwab et al. |
| 4,830,939 A | 5/1989 | Lee et al. |
| 4,840,858 A | 6/1989 | Furukawa et al. |
| 4,925,752 A | 5/1990 | Fauteux et al. |
| 4,935,317 A | 6/1990 | Fauteux et al. |
| 4,990,413 A | 2/1991 | Lee et al. |
| 5,011,501 A | 4/1991 | Shackle et al. |
| 5,028,500 A | 7/1991 | Fong et al. |
| 5,037,712 A | 8/1991 | Shackle et al. |
| 5,130,211 A | 7/1992 | Wilkinson et al. |
| 5,240,790 A | 8/1993 | Chua et al. |
| 5,252,413 A | 10/1993 | Alamgir et al. |
| 5,262,253 A | 11/1993 | Golovin |
| 5,272,022 A | 12/1993 | Takami et al. |
| 5,300,373 A | 4/1994 | Shackle |
| 5,326,653 A | 7/1994 | Chang |
| 5,340,670 A | 8/1994 | Takami et al. |
| 5,399,447 A | 3/1995 | Chaloner-Gill et al. |
| 5,411,820 A | 5/1995 | Chaloner-Gill |
| 5,418,090 A | 5/1995 | Koksbang et al. |
| 5,418,091 A | 5/1995 | Gozdz et al. |
| 5,435,054 A | 7/1995 | Tonder et al. |
| 5,456,000 A | 10/1995 | Gozdz et al. |
| 5,460,904 A | 10/1995 | Gozdz et al. |
| 5,463,179 A | 10/1995 | Chaloner-Gill et al. |
| 5,482,795 A | 1/1996 | Chaloner-Gill |
| 5,508,130 A | 4/1996 | Golovin |
| 5,514,490 A | 5/1996 | Chen et al. |
| 5,538,811 A | 7/1996 | Kanbara et al. |
| 5,538,814 A | 7/1996 | Kamauchi et al. |
| 5,540,741 A | 7/1996 | Gozdz et al. |
| 5,541,020 A | 7/1996 | Golovin et al. |
| 5,620,810 A | 4/1997 | Golovin et al. |
| 5,643,695 A | 7/1997 | Barker et al. |
| 5,660,948 A | 8/1997 | Barker |
| 5,686,138 A | 11/1997 | Fujimoto et al. |
| 5,695,893 A | 12/1997 | Arai et al. |
| 5,700,298 A | 12/1997 | Shi et al. |
| 5,712,059 A | 1/1998 | Barker et al. |
| 5,721,070 A | 2/1998 | Shackle |
| 5,773,165 A | 6/1998 | Sugeno |
| 5,804,335 A | 9/1998 | Kamauchi et al. |
| 5,830,602 A | 11/1998 | Barker et al. |
| 5,851,504 A | 12/1998 | Barker et al. |
| 5,869,207 A | 2/1999 | Saidi et al. |
| 5,871,866 A | 2/1999 | Barker et al. |
| 5,882,818 A | 3/1999 | Fujimoto et al. |
| 5,908,716 A | 6/1999 | Barker |
| 5,910,382 A | 6/1999 | Goodenough et al. |
| 5,993,997 A | 11/1999 | Fujimoto et al. |
| 6,020,087 A | 2/2000 | Gao |
| 6,077,897 A | 6/2000 | Wen et al. |
| 6,085,015 A | 7/2000 | Armand et al. |
| 6,096,234 A | 8/2000 | Nakanishi et al. |

(Continued)

FOREIGN PATENT DOCUMENTS

CA   2200998 A1   9/1998

(Continued)

OTHER PUBLICATIONS

Thomas B. Reddy and Sohrab Hossain, Rechargeable Lithium Batteries (Ambient Temperature), Handbook of Batteries, 3rd Edition, Chapter 34, (2002).

PCT Search Report for International Application No. PCT/US00/35302, Feb. 7, 2001.

K. Amine, H. Yasuda and M. Yamachi; Olivine LiCoPG4 as 4.8 V Electrode Material for Lithium Batreries; Electrochemical and Solid-State Letters, 3 (4) 178-179 (2000).

Anna S. Anderson, John O. Thomas, Benta Kalska and Lennart Haggstrom; Thermal Stability of LiFePO4-Based Cathodes; Electrochemical and Solid-State Letters, 3 (2) 66-68 (2000).

Alcantara et al., J. Electrochemical Society, v. 149(2), pp. A201-205 (2002).

(Continued)

*Primary Examiner* — Tracy Dove
(74) *Attorney, Agent, or Firm* — Cynthia S. Kovacevic; Brian T. Mangum; Roger A. Williams

(57) ABSTRACT

A secondary electrochemical cell is described having (a) a first electrode comprising an active material of the formula $Li_aCo_eFe_fM^1{}_gM^2{}_hM^3{}_iXY_4$, (b) a second electrode which is a counter-electrode to said first electrode; and (c) an electrolyte comprising an electrolyte salt, a cyclic ester and a carbonate selected from the group consisting of alkyl carbonates, alkylene carbonates, and mixtures thereof.

24 Claims, No Drawings

U.S. PATENT DOCUMENTS

| | | | |
|---|---|---|---|
| 6,103,419 | A | 8/2000 | Saidi et al. |
| 6,110,622 | A | 8/2000 | Frysz et al. |
| 6,136,472 | A | 10/2000 | Barker et al. |
| 6,153,333 | A | 11/2000 | Barker |
| 6,183,718 | B1 | 2/2001 | Barker et al. |
| 6,190,804 | B1 | 2/2001 | Ishiko et al. |
| 6,203,946 | B1 | 3/2001 | Barker et al. |
| 6,235,433 | B1 | 5/2001 | Amano et al. |
| 6,268,088 | B1 | 7/2001 | Oh et al. |
| 6,280,882 | B1 | 8/2001 | Vallee et al. |
| 6,284,412 | B1 | 9/2001 | Minakata et al. |
| 6,291,106 | B1 | 9/2001 | Daido et al. |
| 6,296,973 | B1 | 10/2001 | Michot et al. |
| 6,306,215 | B1 | 10/2001 | Larkin |
| 6,329,103 | B1 | 12/2001 | Ishiko et al. |
| 6,387,568 | B1 | 5/2002 | Barker et al. |
| 6,391,493 | B1 | 5/2002 | Goodenough et al. |
| 6,447,951 | B1 | 9/2002 | Barker et al. |
| 6,514,640 | B1 | 2/2003 | Armand et al. |
| 6,777,132 | B2 | 8/2004 | Barker et al. |
| 6,984,470 | B2 * | 1/2006 | Morishima et al. ...... 429/231.95 |
| 2001/0033953 | A1 | 10/2001 | Gan et al. |
| 2001/0041295 | A1 | 11/2001 | Vallee et al. |
| 2001/0049032 | A1 | 12/2001 | Gan |
| 2001/0055718 | A1 | 12/2001 | Li et al. |
| 2001/0055719 | A1 | 12/2001 | Akashi et al. |
| 2002/0004161 | A1 | 1/2002 | Yamaguchi |
| 2002/0004169 | A1 | 1/2002 | Yamada et al. |
| 2002/0010998 | A1 | 1/2002 | Komatsu |
| 2002/0039688 | A1 | 4/2002 | Barker et al. |
| 2002/0192553 | A1 | 12/2002 | Barker et al. |
| 2003/0013019 | A1 | 1/2003 | Barker et al. |
| 2003/0027049 | A1 | 2/2003 | Barker et al. |
| 2003/0190528 | A1 | 10/2003 | Saidi et al. |
| 2003/0215715 | A1 | 11/2003 | Barker et al. |
| 2004/0185344 | A1 | 9/2004 | Barker et al. |

FOREIGN PATENT DOCUMENTS

| | | |
|---|---|---|
| EP | 1 049 182 A2 | 11/2000 |
| EP | 1 094 533 A1 | 4/2001 |
| JP | 9-134724 A1 | 5/1997 |
| JP | 9-134725 A1 | 5/1997 |
| JP | 9-171827 A1 | 6/1997 |
| JP | 11-025983 A1 | 1/1999 |
| JP | 2001-110414 A1 | 4/2001 |
| WO | WO 98/12761 A1 | 3/1998 |
| WO | WO 00/31812 A1 | 6/2000 |
| WO | WO 00/57505 A1 | 9/2000 |
| WO | WO 01/13443 A2 | 2/2001 |
| WO | WO 01/53198 A1 | 7/2001 |
| WO | WO 01/54212 A1 | 7/2001 |
| WO | WO 01/84655 A1 | 11/2001 |
| WO | WO 02/27824 A1 | 4/2002 |

OTHER PUBLICATIONS

Stevens et al., J. Electrochemical Society. v. 148(8), pp. A803-A811 (2001).

Stevens et al., Electrochemical Society, v, 147(4), pp. 1271-1273 (Apr. 6, 2000).

International Search Report for PCT/US03/09634, Jun. 5, 2003.

Padhi et al., "Phospho-Olivines as Positive-Electrode Material for Rechargeable Lithium Batteries" J. Electrochem. Soc., vol. 44(4). pp. 1188-1195 (Apr. 1997).

Padhi et al., "Tuning the Position of the Redox Couples in Materials with NASICON Structure by Anionic Substitution" J. Electrochem. Soc., 145(5), 1518-1520 (1998).

Masquelier et al., "$Li_3Fe_2(XO_4)_3$, (X= P, As): Three Framework Structures as Hosts for the Reversible Insertion of Lithium" Proc. Power Sources Conf., 37th, pp. 188-191 (1996).

Delmas et al., "Ionic Conductivity in a New NASICON Related Solid Solution: $Na_{3+y}Cr_{2-y}Mg_y(PO_4)_3$, an Optical Characterization of the Skeleton Covaleney" Mat. Res. Bull., vol. 21, pp. 469-477 (1986).

Gopalakrishnan et al., "$V_2(PO_4)_3$: a novel NASICON-type Vanadium Phosphate Synthesized by Oxidative Deintercalation of Sodium from $Na_3V_2(PO_4)_3$" Chemistry of Materials, vol. 4(4), pp. 745-747 (Jul./Aug. 1992).

Aono et al., "Electrical Properties and Sinterability for Lithium Germanium Phosphate $Li_{1-k}M_xGe_{2-x}(PO_4)_3$, M= Al, Cr, Ga, Fe, Sc and In Systems" Bull. Chem. Soc. Jpn., vol. 65(8), pp. 2200-2204 (Aug. 1992).

Okada et al., "$Fe_2(SO_4)_3$ as a Cathode Material Rechargeable Lithium Batteries" Proc. Power Sources Conf., 36th, pp. 110-113 (1994).

Fey et al., "LiNiVO4: a 4.8 Volt Electrode Material for Lithium Cells" J. Electrochem. Soc., vol. 141, No. 9, pp. 2279-2282 (Sep. 1994).

Rangan et al., "$AM^VM^{Iu}(PO_4)_3$: New Mixed Metal Phosphates Having NASICON and Related Structures" Inorg. Chem., vol. 34, pp. 1969-1972 (1995).

Okada et al., "Characteristics of 3-D Framework Cathodes with $(XO4)^{n-}$ Polyanions" Prog. Batteries Battery Mater., vol. 16, pp. 302-308 (1997).

Padhi et al., "Mapping of Transition Metal Redox Energies in Phosphates with Nasicon Structure by Lithium Intercalation" J. Electrochem. Soc., 144(8), pp. 2581-2586 (1997) (abstract only).

Butt et al., "Lithium Metal Phosphate Cathodes for Li Secondary Batteries" J. Australas. Ceram. Soc., 34(1), pp. 60-65 (1998).

Goodenough et al., "Cathodes for Lithium-Ion Batteries: Some Comparisons" Kenki Kagaku Oyobi Kogyo Buisuri Kagaku, 66(12), pp. 1173-1181 (1998).

Martinez-Juarez et al., "Relationship Between Activation Energy and Bottleneck Size for Li+ Ion Conduction in NASICON Materials of Composition $LiMM'(PO_4)_3$; M= Ge, Ti, Sn, Hf" J. Phys. Chem B., vol. 102, pp. 372-375 (1998).

Nanjundaswamy et al., "Synthesis, Redox Potential Evaluation and Electrochemical Characteristics of NASICON-Related-3D Framework Compounds" Solid State Ionics, vol. 92, pp. 1-10 (1996).

Goodenough et al., "Supercapacitors and batteries" Mater. Res. Soc. Symp. Proc., 548 (Solid State Ionics V), pp. 655-665 (1999).

Masquelier et al., "New Cathode Materials for Rechargeable Lithium Batteries: The 3-D Framework Structures $Li_3Fe_2(XO_4)_3$ (X= P, As)" J. Solid State Chem., 135(2), pp. 228-234 (1998).

Padhi et al., "Effect of Structure on the Fe3+/Fe2+ Redox Couple in Fe Phosphates" J. Electorehem. Soc., vol. 144(5), pp. 1609-1613 (1997).

* cited by examiner

US 8,318,352 B2

BATTERIES COMPRISING ALKALI-TRANSITION METAL PHOSPHATES AND PREFERRED ELECTROLYTES

This application is a divisional of application Ser. No. 10/116,276 filed Apr. 3, 2002, pending.

FIELD OF THE INVENTION

This invention relates to batteries. In particular, this invention relates to batteries comprising active materials comprising lithium or other alkali metals, transition metals, and phosphates or similar moieties, with electrolytes comprising alkylene carbonates and cyclic esters.

BACKGROUND OF THE INVENTION

A wide variety of electrochemical cells, or "batteries," is known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can be generally described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

There are a variety of secondary battery systems known in the art. Among the most common systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

Cells having a metallic lithium anode and metal chalcogenide cathode are charged in an initial condition. During discharge, lithium metal yields electrons to an external electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions (Li+) between the anode and cathode during charge and discharge cycles had led to these cells as being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, $CuCl_2$. Transition metal oxides, such as those of the general formula $Li_xM_2O_y$, are among those materials preferred in such batteries having intercalation electrodes. Other materials include lithium transition metal phosphates, such as $LiFePO_4$, and $Li_3V_2(PO_4)_3$. Such materials having structures similar to olivine or NASICON materials are among those known in the art. Cathode active materials among those known in the art are disclosed in S. Hossain, "Rechargeable Lithium Batteries (Ambient Temperature)," Handbook of Batteries, 2d ed., Chapter 36, McGraw Hill (1995); U.S. Pat. No. 4,194,062, Carides, et al., issued Mar. 18, 1980; U.S. Pat. No. 4,464,447, Lazzari, et al., issued Aug. 7, 1984; U.S. Pat. No. 5,028,500, Fong et al., issued Jul. 2, 1991; U.S. Pat. No. 5,130,211, Wilkinson, et al., issued Jul. 14, 1992; U.S. Pat. No. 5,418,090, Koksbang et al., issued May 23, 1995; U.S. Pat. No. 5,514,490, Chen et al., issued May 7, 1996; U.S. Pat. No. 5,538,814, Kamauchi et al., issued Jul. 23, 1996; U.S. Pat. No. 5,695,893, Arai, et al., issued Dec. 9, 1997; U.S. Pat. No. 5,804,335, Kamauchi, et al., issued Sep. 8, 1998; U.S. Pat. No. 5,871,866, Barker et al., issued Feb. 16, 1999; U.S. Pat. No. 5,910,382, Goodenough, et al., issued Jun. 8, 1999; PCT Publication WO/00/31812, Barker, et al., published Jun. 2, 2000; PCT Publication WO/00/57505, Barker, published Sep. 28, 2000; U.S. Pat. No. 6,136,472, Barker et al., issued Oct. 24, 2000; U.S. Pat. No. 6,153,333, Barker, issued Nov. 28, 2000; European Patent Publication 1,049,182, Ravet et al., published Nov. 2, 2000; PCT Publication WO/01/13443, Barker, published Feb. 22, 2001; PCT Publication WO/01/54212, Barker et al., published Jul. 26, 2001; PCT Publication WO/01/84655, Barker et al., published Nov. 8, 2001.

Preferably, such a cathode material exhibits a high free energy of reaction with lithium, is able to release and insert a large quantity of lithium, maintains its lattice structure upon insertion and extraction of lithium, allows rapid diffusion of lithium, affords good electrical conductivity, is not significantly soluble in the electrolyte system of the battery, and is readily and economically produced. However, many of the cathode materials known in the art lack one or more of these characteristics. As a result, for example, many such materials are not economical to produce, afford insufficient voltage, have insufficient charge capacity, or lose their ability to be recharged over multiple cycles.

SUMMARY OF THE INVENTION

The invention provides batteries comprising active materials comprising lithium or other alkali metals, transition metals and optionally other metals, and a phosphate, substituted phosphate or similar moiety. In particular, the present invention provides a lithium battery comprising (A) a first electrode comprising an active material of the formula

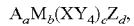

wherein
  (i.) A is selected from the group consisting of Li, Na, K, and mixtures thereof, and $0 < a \leq 9$;
  (ii.) M is one or more metals, comprising at least one metal which is capable of undergoing oxidation to a higher valence state, and $1 \leq b \leq 3$;
  (iii.) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is selected from the group consisting of halogen, S, N, and mixtures thereof; $0 \leq x < 3$; and $0 < y \leq 2$; and $0 < c \leq 3$;
  (iv.) Z is OH, halogen, or mixtures thereof, and $0 \leq d \leq 6$; and
  (v.) wherein M, $XY_4$, Z, a, b, c, d, x and y are selected so as to maintain electroneutrality of said compound;

(B) a second electrode which is a counter-electrode to said first electrode; and (C) an electrolyte comprising a mixture of a cyclic ester and a carbonate selected from the group consisting of alkyl carbonates, alkylene carbonates, and mixtures thereof.

In a preferred embodiment, M comprises two or more transition metals from Groups 4 to 11 of the Periodic Table. In another preferred embodiment, M comprises M'M", where M' is at least one transition metal from Groups 4 to 11 of the Periodic Table; and M" is at least one element from Groups 2, 3, and 12-16 of the Periodic Table. Preferred embodiments include those where c=1, those where c=2, and those where c=3. Preferred embodiments include those where a≦1 and c=1, those where a=2 and c=1, and those where a≧3 and c=3. Preferred embodiments also include those having a structure similar to the mineral olivine (herein "olivines"), and those having a structure similar to NASICON (NA Super Ionic CONductor) materials (herein "NASICONs"). In a particularly preferred embodiment, M comprises $Co_eFe_fM^1_gM^2_hM^3_i$, where $M^1$ is at least one transition metal from Groups 4 to 11 of the Periodic Table; $M^2$ comprises one or more +2 oxidation state non-transition metals, and $M^3$ comprises one or more +3 oxidation state non-transition metals, and e+f+g=b. In such an embodiment, preferably A comprises Li, $0.8 \leq a \leq 1.2$, $0.8 \leq b \leq 1.5$, and c=1. As used herein, unless otherwise specified, a variable described algebraically as equal to ("="), less than or equal to ("≦"), or greater than or equal to ("≧") a number is intended to subsume values or ranges of values about equal or functionally equivalent to said number.

It has been found that the novel batteries of this invention afford benefits over such materials and devices among those known in the art. Such benefits include one or more of increased capacity, enhanced cycling capability, enhanced reversibility, and reduced costs. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

DESCRIPTION OF THE INVENTION

The present invention provides batteries comprising certain electrode active materials and electrolytes. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

The electrode active materials of this invention may be used in the anode, the cathode, or both. Preferably, the active materials of this invention are used in the cathode. (As used herein, the terms "anode" and "cathode" refer to the electrodes at which oxidation and reduction occur, respectively, during battery discharge. During charging of the battery, the sites of oxidation and reduction are reversed. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

Electrode Active Materials:

The present invention provides active materials (herein "electrode active materials") comprising lithium or other alkali metals, a transition metal, a phosphate or similar moiety, and (optionally) a halogen or hydroxyl moiety. Such electrode active materials include those of the formula $A_aM_b(XY_4)_cZ_d$. (As used herein, the word "include," and its variants, is intended to be non-limiting, such that recitation of items in a list is not to the exclusion of other like items that may also be useful in the materials, compositions, devices, and methods of this invention.)

A is selected from the group consisting of Li (lithium), Na (sodium), K (potassium), and mixtures thereof. In a preferred embodiment, A is Li, a mixture of Li with Na, a mixture of Li with K, or a mixture of Li, Na and K. In another preferred embodiment, A is Na, or a mixture of Na with K. Preferably "a" is from about 0.1 to about 6, more preferably from about 0.2 to about 6. Where c=1, a is preferably from about 0.1 to about 3, preferably from about 0.2 to about 2. In a preferred embodiment, where c=1, a is less than about 1. In another preferred embodiment, where c=1, a is about 2. Preferably "a" is from about 0.8 to about 1.2. Where c=2, a is preferably from about 0.1 to about 6, preferably from about 1 to about 6. Where c=3, a is preferably from about 0.1 to about 6, preferably from about 2 to about 6, preferably from about 3 to about 6. In another embodiment, "a" is preferably from about 0.2 to about 1.0.

In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_a M_b (XY_4)_c Z_d$, the amount (a') of alkali metal that can be removed, as a function of the quantity of (b') and valence state ($V^M$) of oxidizable metal (M), is $$a' = b'(\Delta V^M),$$

where $\Delta V^M$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^M = 1$, wherein iron may be oxidized to the +3 oxidation state (although iron may also be oxidized to a +4 oxidation state in some circumstances). If b=1 (one atomic unit of Fe per atomic unit of material), the maximum amount (a') of alkali metal (oxidation state +1) that can be removed during cycling of the battery is 1 (one atomic units of alkali metal). If b=1.25, the maximum amount of (a') of alkali metal that can be removed during cycling of the battery is 1.25.

In general, the value of "a" in the active materials can vary over a wide range. In a preferred embodiment, active materials are synthesized for use in preparing a lithium ion battery in a discharged state. Such active materials are characterized by a relatively high value of "a", with a correspondingly low oxidation state of M of the active material. As the battery is charged from its initial uncharged state, an amount a' of lithium is removed from the active material as described above. The resulting structure, containing less lithium (i.e., a-a') than in the as-prepared state as well as the transition metal in a higher oxidation state than in the as-prepared state, is characterized by lower values of a, while essentially maintaining the original value of b. The active materials of this invention include such materials in their nascent state (i.e., as manufactured prior to inclusion in an electrode) and materials formed during operation of the battery (i.e., by insertion or removal of Li or other alkaline metal).

The value of "b" and the total valence of M in the active material must be such that the resulting active material is electrically neutral (i.e., the positive charges of all cationic species in the material balance the negative charges of all anionic species), as further discussed below. The net valence of M ($V^M$) having a mixture of elements (M1, M2 ... Mt) may be represented by the formula $$V^M = V^{M1} b_1 + V^{M2} b_2 + \ldots V^{Mt} b_t,$$

where $b_1 + b_2 + \ldots b_t = 1$, and $V^{M1}$ is the oxidation state of M1, $V^{M2}$ is the oxidation state of M2, etc. (The net valence of M and other components of the electrode active material is discussed further, below.)

M is one or more metals including at least one metal that is capable of undergoing oxidation to a higher valence state (e.g., $Co^{+2} \rightarrow Co^{+3}$), preferably a transition metal selected from Groups 4-11 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In another preferred embodiment, M further comprises a non-transition metal selected from Groups 2, 3, and 12-16 of the Periodic Table.

In another preferred embodiment, preferably where c=1, M comprises $Co_e$, $Fe_f M^1_g M^2_h M^3_i$, wherein $M^1$ is at least one transition metal from Groups 4 to 11, $M^2$ is at least one +2 oxidation state non-transition metal, $M^3$ is at least one +3 oxidation state non transition metal, $e \geq 0$, $f \geq 0$, $g \geq 0$, $h \geq 0$, $i \geq 0$ and (e+f+g+h+i)=b. Preferably, at least one of e and f are greater than zero, more preferably both. In a preferred embodiment $0 < (e+f+g+h+i) \leq 2$, more preferably $0.8 \leq (e+f+g) \leq 1.2$, and even more preferably $0.9 \leq (e+f+g) \leq 1.0$. Preferably, $e \geq 0.5$, more preferably $e \geq 0.8$. Preferably, $0.01 \leq f \leq 0.5$, more preferably $0.05 \leq f \leq 0.15$. Preferably, $0.01 \leq g \leq 0.5$, more preferably $0.05 \leq g \leq 0.2$. In a preferred embodiment, (h+i)>1, preferably $0.01 \leq (h+i) \leq 0.5$, and even more preferably $0.01 \leq (h+i) \leq 0.1$. Preferably, $0.01 \leq h \leq 0.2$, more preferably $0.01 \leq h \leq 0.1$. Preferably $0.01 \leq i \leq 0.2$, more preferably $0.01 \leq i \leq 0.1$.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals include those selected from the group consisting of Fe, Co, Ti, Mn, and mixtures thereof. In a preferred embodiment, M is $Co_{1-m} Fe_m$, where $0 < m \leq 0.5$. Preferably $0.01 < m \leq 0.2$. Although, a variety of oxidation states for such transition metals are available, in some embodiments it is most preferable that the transition metals have a +2 oxidation state. As used herein, the recitation of a genus of elements, materials or other components, from which an individual component or mixture of components can be selected, is intended to include all possible sub-generic combinations of the listed components, and mixtures thereof.

In a preferred embodiment, M further comprises one or more non-transition metals. As referred to herein, "non-transition metals" include metals and metalloids from Groups 2, 3, and 12-16 of the Periodic Table that are capable of forming stable active materials and do not significantly impede the insertion or removal of lithium or other alkaline metals from the active materials under normal operating conditions. Preferably, such elements do not include C (carbon), Si (silicon), N (nitrogen) and P (phosphorus). Preferred non-transition metals include those not readily capable of undergoing oxidation to a higher valence state in the electrode active material under normal operating conditions. Among the non-transition metals useful herein are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

As further discussed herein, "b" is selected so as to maintain electroneutrality of the electrode active material. In a preferred embodiment, where c=1, b is from about 1 to about 2, preferably about 1. In another preferred embodiment, where c=2, b is from about 2 to about 3, preferably about 2.

$XY_4$ is an anion, preferably selected from the group consisting of $X'O_{4-x}Y'_x$, $X'O_{4-y}Y'_{2y}$, $X''S_4$, and mixtures thereof, where X' is selected from the group consisting of P (phosphorus), As (arsenic), Sb (antimony), Si (silicon), Ge (germanium), V (vanadium) S (sulfur), and mixtures thereof; X" is selected from the group consisting of P, As, Sb, Si, Ge, V, and mixtures thereof. $XY_4$ anions useful herein include phosphate, silicate, germanate, vanadate, arsenate, antimonate, sulfur analogs thereof, and mixtures thereof. In a preferred embodiment, X' and X" are each selected from the group consisting of P, Si, and mixtures thereof. In a particularly preferred embodiment, X' and X" are P.

Y' is selected from the group consisting of halogen, S, N, and mixtures thereof. Preferably Y' is F (fluorine). In a preferred embodiment $0 \leq x \leq 3$; and $0 < y \leq 2$, such that a portion of the oxygen (O) in the $XY_4$ moiety is substituted with halogen. In another preferred embodiment, x and y are 0. In a particularly preferred embodiment $XY_4$ is $X'O_4$, where X' is preferably P or Si, more preferably P. In another particularly preferred embodiment, $XY_4$ is $PO_{4-x}Y'_x$, where Y' is halogen and $0 < x \leq 1$. Preferably $0.01 \leq x \leq 0.05$, more preferably $0.02 \leq x \leq 0.03$.

In a preferred embodiment, $XY_4$ is $PO_4$ (a phosphate group) or a mixture of $PO_4$ with another $XY_4$ group (i.e., where X' is not P, Y' is not O, or both, as defined above). When part of the phosphate group is substituted, it is preferred that the substitute group be present in a minor amount relative to the phosphate. In a preferred embodiment, $XY_4$ comprises 80% or more phosphate and up to about 20% of one or more phosphate substitutes. Phosphate substitutes include, without limitation, silicate, sulfate, antimonate, germanate, arsenate, monofluoromonophosphate, difluoromonophosphate, sulfur analogs thereof, and combinations thereof. Preferably, $XY_4$ comprises a maximum of about 10% of a phosphate substitute or substitutes. (The percentages are based on mole percent.) Preferred $XY_4$ groups include those of the formula $(PO_4)_{1-k}(B)_k$, where B represents an $XY_4$ group or combination of $XY_4$ groups other than phosphate, and $k \leq 0.5$. Preferably, $k \leq 0.8$, more preferably less than about $k \leq 0.2$, more preferably $k \leq 0.1$.

Z is OH, halogen, or mixtures thereof. In a preferred embodiment, Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. In one preferred embodiment, d=0. In another preferred embodiment, d>0, preferably from about 0.1 to about 6, more preferably from about 0.2 to about 6. In such embodiments, where c=1, d is preferably from about 0.1 to about 3, preferably from about 0.2 to about 2. In a preferred embodiment, where c=1, d is about 1. Where c=2, d is preferably from about 0.1 to about 6, preferably from about 1 to about 6. Where c=3, d is preferably from about 0.1 to about 6, preferably from about 2 to about 6, preferably from about 3 to about 6.

The composition of M, $XY_4$, Z and the values of a, b, c, d, x, and y are selected so as to maintain electroneutrality of the electrode active material. As referred to herein "electroneutrality" is the state of the electrode active material wherein the sum of the positively charged species (e.g., A and M) in the material is equal to the sum of the negatively charged species (e.g., $XY_4$) in the material. Preferably, the $XY_4$ moieties are comprised to be, as a unit moiety, an anion having a charge of −2, −3, or −4, depending on the selection of X', X", Y', and x and y. When $XY_4$ is a mixture of groups such as the preferred phosphate/phosphate substitutes discussed above, the net charge on the $XY_4$ anion may take on non-integer values, depending on the charge and composition of the individual groups $XY_4$ in the mixture.

In general, the valence state of each component element of the electrode active material may be determined in reference to the composition and valence state of the other component elements of the material. By reference to the general formula $A_aM_b(XY_4)_cZ_d$, the electroneutrality of the material may be determined using the formula $$(V^A)a + (V^M)b + (V^X)c = (V^Y)4c + (V^Z)d$$

where $V^A$ is the net valence of A, $V^M$ is the net valence of M, $V^Y$ is the net valence of Y, and $V^Z$ is the net valence of Z. As referred to herein, the "net valence" of a component is (a) the valence state for a component having a single element which occurs in the active material in a single valence state; or (b) the mole-weighted sum of the valence states of all elements in a component comprising more than one element, or comprising a single element having more than one valence state. The net valence of each component is represented in the following formulae.

$$(V^A)b = [(V^{A1})a^1 + (V^{A2})a^2 + \ldots (V^{An})a^n]/n;\ a^1 + a^2 + \ldots a^n = a$$

$$(V^M)b = [(V^{M1})b^1 + (V^{M2})b^2 + \ldots (V^{Mn})b^n]/n;\ b^1 + b^2 + \ldots b^n = b$$

$$(V^X)c = [(V^{X1})c^1 + (V^{X2})c^2 + \ldots (V^{Xn})c^n]/n;\ c^1 + c^2 + \ldots c^n = c$$

$$(V^Y)c = [(V^{Y1})c^1 + (V^{Y2})c^2 + \ldots (V^{Yn})c^n]/n;\ c^1 + c^2 + \ldots c^n = c$$

$$(V^Z)d = [(V^{Z1})d^1 + (V^{Z2})d^2 + \ldots (V^{Zn})d^n]/n;\ d^1 + d^2 + \ldots d^n = d$$

In general, the quantity and composition of M is selected given the valency of X, the value of "c," and the amount of A, so long as M comprises at least one metal that is capable of oxidation. The calculation for the valence of M can be simplified, where $V^A = 1$, $V^Z = 1$, as follows.

For compounds where c=1: $(V^M)b = (V^Y)4 + d - a - (V^X)$

For compounds where c=3: $(V^M)b = (V^Y)12 + d - a - (V^X)3$

The values of a, b, c, d, x, and y may result in stoichiometric or non-stoichiometric formulas for the electrode active materials. In a preferred embodiment, the values of a, b, c, d, x, and y are all integer values, resulting in a stoichiometric formula. In another preferred embodiment, one or more of a, b, c, d, x and y may have non-integer values. It is understood, however, in embodiments having a lattice structure comprising multiple units of a non-stoichiometric formula $A_aM_b(XY_4)_cZ_d$, that the formula may be stoichiometric when looking at a multiple of the unit. That is, for a unit formula where one or more of a, b, c, d, x, or y is a non-integer, the values of each variable become an integer value with respect to a number of units that is the least common multiplier of each of a, b, c, d, x and y. For example, the active material $Li_2Fe_{0.5}Mg_{0.5}PO_4F$ is non-stoichiometric. However, in a material comprising two of such units in a lattice structure, the formula is $Li_4FeMg(PO_4)_2F_2$.

A preferred electrode active material embodiment comprises a compound of the formula $$Li_aM_b(PO_4)Z_d,$$

wherein
(1) $0.1 < a \leq 4$;
(2) M is $M'_{1-m}M''_m$, where M' is at least one transition metal from Groups 4 to 11 of the Periodic Table; M" is at least one non-transition metal from Groups 2, 3, and 12-16 of the Periodic Table, $0 < m < 1$, and $1 \leq b \leq 3$; and
(3) Z comprises halogen, and $0 \leq d \leq 4$; and wherein M, Z, a, b, and d are selected so as to maintain electroneutrality of said compound. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably M" is selected from the group consisting of Mg, Ca, Zn, Ba, Al, and mixtures thereof. Preferably Z comprises F.

Another preferred embodiment comprises a compound of the formula:

$$A_aM_b(XY_4)_3Z_d,$$

wherein
(1) A is selected from the group consisting of Li, Na, K, and mixtures thereof, and $2 \leq a \leq 9$;
(2) M comprises one or more metals, comprising at least one metal which is capable of undergoing oxidation to a higher valence state, and $1 \leq b \leq 3$;
(3) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is selected from the group consisting of halogen, S, N, and mixtures thereof; $0 \leq x < 3$; and $0 < y < 4$; and
(4) Z is OH, halogen, or mixtures thereof, and $0 \leq d \leq 6$; and
(5) wherein M, $XY_4$, Z, a, b, d, x and y are selected so as to maintain electroneutrality of said compound.

In a preferred embodiment, A comprises Li, or mixtures of Li with Na or K. In another preferred embodiment, A comprises Na, K, or mixtures thereof. In a preferred embodiment, M comprises two or more transition metals from Groups 4 to 11 of the Periodic Table, preferably transition metals selected from the group consisting of Fe, Co, Ni, Mn, Cu, V, Zr, Ti, Cr, and mixtures thereof. In another preferred embodiment, M comprises $M'_{1-m}M''_m$, where M' is at least one transition metal from Groups 4 to 11 of the Periodic Table; and M" is at least one element from Groups 2, 3, and 12-16 of the Periodic Table; and $0 < m < 1$. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably, M" is selected from the group consisting of Mg, Ca, Zn, Ba, Al, and mixtures thereof. In a preferred embodiment, $XY_4$ is $PO_4$. In another preferred embodiment, X' comprises As, Sb, Si, Ge, S, and mixtures thereof; X" comprises As, Sb, Si, Ge and mixtures thereof; and $0 < x < 3$. In a preferred embodiment, Z comprises F, or mixtures of F with Cl, Br, OH, or mixtures thereof. In another preferred embodiment, Z comprises OH, or mixtures thereof with Cl or Br.

Another preferred embodiment comprises a compound of the formula $$A_aM^1_eM^2_fM^3_gXY_4,$$

wherein
(1) A is selected from the group consisting of Li, Na, K, and mixtures thereof, and $0 < a \leq 2$;
(2) $M^1$ comprises one or more transition metals, where $e > 0$;
(3) $M^2$ comprises one or more +2 oxidation state non transition metals, where $f > 0$;
(4) $M^3$ comprises one or more +3 oxidation state non-transition metal, where $g > 0$; and
(5) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is selected from the group consisting of halogen, S, N, and mixtures thereof; $0 \leq x \leq 3$; and $0 < y \leq 2$; and
(6) wherein $e+f+g < 2$, and $M^1$, $M^2$, $M^3$, $XY_4$, a, e, f, g, x, and y are selected so as to maintain electroneutrality of said compound.

In embodiments where $XY_4$ is $PO_{4-x}Y'_x$ and $M^1$ is a +2 oxidation state transition metal, $a+2e+2f+3g=3-x$.

Preferably, $e+f+g=b$. In a preferred embodiment $0 < (e+f+g) < 2$, more preferably $0.8 \leq (e+f+g) \leq 1.5$, and even more preferably $0.9 \leq (e+f+g) \leq 1$, wherein $0.01 \leq (f+g) \leq 0.5$, more preferably $0.05 \leq (f+g) \leq 0.2$, and even more preferably $0.05 \leq (f+g) \leq 0.1$.

In a preferred embodiment, A is Li. Preferably, $M^1$ is at least one transition metal from Groups 4 to 11 of the Periodic Table; $M^2$ is at least one non-transition metal from Groups 2, 3, and 12-16 of the Periodic Table, and $M^3$ is a +3 oxidation state metal selected from Group 13. Preferably $M^1$ is selected from the group consisting of Fe, Co, Ni, Mn, Cu, V, Zr, Ti, Cr, and mixtures thereof; more preferably $M^1$ is a +2 oxidation state transition metal selected from the group consisting of Fe, Co, Mn, Cu, V, Cr, and mixtures thereof. Preferably $M^2$ is selected from the group consisting +2 oxidation state non-transition metals and mixtures thereof; more preferably $M^2$ is selected from the group consisting of Be, Mg, Ca, Sr, Ba, Ra, Zn, Cd, Hg and mixtures thereof. Preferably, $M^3$ is a +3 oxidation state non-transition metal, preferably $M^3$ is selected from Group 13, more preferably Sc, Y, La, Ac, B, Al, Ga, In, Tl and mixtures thereof. Preferably $M^3$ is Al. Preferably $0 < (f+g) < 1$, preferably $0.01 \leq (f+g) \leq 0.3$, more preferably $0.05 \leq (f+g) \leq 0.1$. Preferably, $0.01 \leq f \leq 0.3$, more preferably $0.05 \leq f \leq 0.1$, and even more preferably $0.01 \leq f \leq 0.03$. Also preferably, $0.01 \leq g \leq 0.3$, more preferably $0.05 \leq g \leq 0.1$, and even more preferably $0.01 \leq g \leq 0.03$.

Another preferred embodiment comprises a compound of the formula $$Li_aCo_eFe_fM^1_gM^2_hM^3_iXY_4$$

wherein
(1) $0 < a \leq 2$, $e > 0$, and $f > 0$;
(2) $M^1$ is one or more transition metals, where $g \geq 0$;
(3) $M^2$ is one or more +2 oxidation state non-transition metals, where $h \geq 0$;
(4) $M^3$ is one or more +3 oxidation state non-transition metals, where $i \geq 0$; and (5) $XY_4$ is selected from the group consisting of $X'O_{4-x}Y'_x$, $X'O_{4-y}Y'_{2y}$, $X''S_4$, and mixtures thereof, where $X'$ is selected from the group consisting of P, As, Sb, Si, Ge, V, S, and mixtures thereof; $X''$ is selected from the group consisting of P, As, Sb, Si, Ge, V, and mixtures thereof; $Y'$ is selected from the group consisting of halogen, S, N, and mixtures thereof; $0 \leq x \leq 3$; and $0 < y \leq 2$;

(1) wherein $(e+f+g+h+i) \leq 2$, and $M^1$, $M^2$, $M^3$, $XY_4$, a, e, f, g, h, i, x, and y are selected so as to maintain electroneutrality of said compound.

Preferably, $0.8 \leq (e+f+g+h+i) \leq 1.2$, more preferably $0.95 \leq (e+f+g+i) \leq 1$. Preferably, $e \geq 0.5$, more preferably, $e \geq 0.8$. Preferably, $0.01 \leq f \leq 0.5$, more preferably, $0.05 \leq f \leq 0.15$. Preferably, $0.01 \leq g \leq 0.5$, more preferably, $0.05 \leq g \leq 0.2$. Preferably $M^1$ is selected from the group consisting of Ti, V, Cr, Mn, Ni, Cu and mixtures thereof. Preferably, $M^1$ is selected from the group consisting of Mn, Ti, and mixtures thereof.

Preferably, $(h+i) > 0$, more preferably $0.01 \leq (h+i) \leq 0.5$, more preferably $0.02 \leq (h+i) \leq 0.3$. Preferably, $0.01 \leq h \leq 0.2$, more preferably, $0.01 \leq h \leq 0.1$. Preferably, $M^2$ is selected from the group consisting of Be, Mg, Ca, Sr, Ba, and mixtures thereof. More preferably, $M^2$ is Mg. Preferably, $0.01 \leq i \leq 0.2$, more preferably $0.01 \leq i \leq 0.1$. Preferably, $M^3$ is selected from the group consisting of B, Al, Ga, In, and mixtures thereof. More preferably, $M^3$ is Al.

In one embodiment, $XY_4$ is $PO_4$. In another embodiment, $XY_4$ is $PO_{4-x}F_x$, and $0 < x \leq 1$, preferably, $0.01 \leq x \leq 0.05$.

Another preferred embodiment comprises a compound having an olivine structure. During charge and discharge of the battery, lithium ions are added to, and removed from, the active material preferably without substantial changes in the crystal structure of the material. Such materials have sites for the alkali metal (e.g., Li), the transition metal (M), and the $XY_4$ (e.g., phosphate) moiety. In some embodiments, all sites of the crystal structure are occupied. In other embodiments, some sites may be unoccupied, depending on, for example, the oxidation states of the metal (M). Among such preferred compounds are those of the formula $$LiM(PO_{4-x}Y'_x)$$

wherein M is $M^1{}_g M^2{}_h M^3{}_i M^4{}_j$, and (1) $M^1$ is one or more transition metals;
(2) $M^2$ is one or more +2 oxidation state non-transition metals;
(3) $M^3$ is one or more +3 oxidation state non-transition metals;
(4) $M^4$ is one or more +1 oxidation state non-transition metals; and
(5) $Y'$ is halogen; and
(6) $g, > 0$; $h \geq 0$; $i \geq 0$; $j \geq 0$; $(g+h+i+j) \leq 1$; and the net valence of M is 2-x.

Preferably, $g \geq 0.8$, more preferably, $g \geq 0.9$. Preferably, $M^1$ is a +2 oxidation state transition metal selected from the group consisting of V, Cr, Mn, Fe, Co, Ni, and mixtures thereof. More preferably, $M^1$ is selected from the group consisting of Fe, Co, and mixtures thereof. Preferably $M^1$ additionally comprises Ti.

Preferably, $(h+i) > 0.1$, more preferably, $0.02 \leq (h+i) \leq 0.5$, more preferably, $0.02 \leq (h+i) \leq 0.3$. Preferably, $0.01 \leq h \leq 0.2$, more preferably, $0.01 \leq h \leq 0.1$. Preferably, $M^2$ is selected from the group consisting of Be, Mg, Ca, Sr, Ba, and mixtures thereof. Preferably, $0.01 \leq i \leq 0.2$, more preferably, $0.01 \leq i \leq 0.1$. Preferably, $M^3$ is Al.

In one embodiment, $j=0$. In another embodiment, $0.01 \leq j \leq 0.1$. Preferably, $M^4$ is selected from the group consisting of Li, Na, and K. More preferably, $M^4$ is Li.

In one embodiment, $x=0$. In another embodiment, $0 < x \leq 1$. In such an embodiment, preferably, $0.01 \leq x \leq 0.05$, and $(g+h+i+j) < 1$. In an embodiment where $j=0$, preferably, $(g+h+i) = 1-x$.

Non-limiting examples of active materials of the invention include the following: $Li_{0.95}Co_{0.8}Fe_{0.15}Al_{0.05}PO_4$,
$Li_{1.025}Co_{0.85}Fe_{0.05}Al_{0.025}Mg_{0.05}PO_4$,
$Li_{1.025}Co_{0.80}Fe_{0.10}Al_{0.025}Mg_{0.05}PO_4$,
$Li_{1.025}Co_{0.45}Fe_{0.45}Al_{0.025}Mg_{0.05}PO_4$,
$Li_{1.025}Co_{0.75}Fe_{0.15}Al_{0.025}Mg_{0.05}PO_4$,  $Li_{1.025}Co_{0.7}(Fe_{0.4}Mn_{0.6})_{0.2}Al_{0.025}Mg_{0.05}PO_4$,
$Li_{1.025}CO_{0.75}Fe_{0.15}Al_{0.025}Mg_{0.05}PO_4$,
$Li_{1.025}Co_{0.85}Fe_{0.05}Al_{0.025}Mg_{0.05}PO_4$,
$Li_{1.025}Co_{0.7}Fe_{0.08}Mn_{0.12}Al_{0.025}Mg_{0.05}PO_4$,
$LiCo_{0.75}Fe_{0.15}Al_{0.025}Ca_{0.05}PO_{3.975}F_{0.025}$,
$LiCo_{0.80}Fe_{0.10}Al_{0.025}Ca_{0.05}PO_{3.975}F_{0.025}$,
$Li_{1.25}Co_{0.6}Fe_{0.1}Mn_{0.075}Mg_{0.025}Al_{0.05}PO_4$,
$Li_{0.1}Na_{0.25}Co_{0.6}Fe_{0.1}Cu_{0.075}Mg_{0.025}Al_{0.05}PO_4$,
$Li_{1.025}Co_{0.8}Fe_{0.1}Al_{0.025}Mg_{0.075}PO_4$,
$Li_{1.025}Co_{0.6}Fe_{0.05}Al_{0.12}Mg_{0.0325}PO_{3.75}F_{0.25}$,
$Li_{1.025}Co_{0.7}Fe_{0.1}Mg_{0.025}Al_{0.04}PO_{3.75}F_{0.25}$,
$Li_{0.75}Co_{0.5}Fe_{0.05}Mg_{0.015}Al_{0.04}PO_3F$,
$Li_{0.75}Co_{0.5}Fe_{0.025}Cu_{0.025}Be_{0.015}Al_{0.04}PO_3F$,
$Li_{0.75}Co_{0.5}Fe_{0.025}Mn_{0.025}Ca_{0.015}Al_{0.04}PO_3F$,
$Li_{1.025}Co_{0.6}Fe_{0.05}B_{0.12}Ca_{0.0325}PO_{3.75}F_{0.25}$,
$Li_{1.025}Co_{0.65}Fe_{0.05}Mg_{0.0125}Al_{0.1}PO_{3.75}F_{0.25}$,
$Li_{1.025}Co_{0.65}Fe_{0.05}Mg_{0.065}Al_{0.14}PO_{3.975}F_{0.025}$,
$Li_{1.075}Co_{0.8}Fe_{0.05}Mg_{0.025}Al_{0.05}PO_{3.975}F_{0.025}$;
$LiCo_{0.8}Fe_{0.1}Al_{0.025}Mg_{0.05}PO_{3.975}F_{0.025}$,
$Li_{0.25}Fe_{0.7}Al_{0.45}PO_4$, $LiMnAl_{0.067}(PO_4)_{0.8}(SiO_4)_{0.2}$,
$Li_{0.95}Co_{0.9}Al_{0.05}Mg_{0.05}PO_4$, $Li_{0.95}Fe_{0.8}Ca_{0.15}Al_{0.05}PO_4$,
$Li_{0.25}MnBe_{0.425}Ga_{0.3}SiO_4$,
$Li_{0.5}Na_{0.25}Mn_{0.6}Ca_{0.375}Al_{0.1}PO_4$,
$Li_{0.25}Al_{0.25}Mg_{0.25}Co_{0.75}PO_4$, $Na_{0.55}B_{0.15}Ni_{0.75}Ba_{0.25}PO_4$,
$Li_{1.025}Co_{0.9}Al_{0.025}Mg_{0.05}PO_4$,
$K_{1.025}Ni_{0.99}Al_{0.025}Ca_{0.05}PO_4$, $Li_{0.95}Co_{0.9}Al_{0.05}Mg_{0.05}PO_4$,
$Li_{0.95}Fe_{0.8}Ca_{0.15}Al_{0.05}PO_4$, $Li_{1.025}Co_{0.7}(Fe_{0.4}Mn_{0.6})_{0.2}Al_{0.025}Mg_{0.05}PO_4$, $Li_{1.025}Co_{0.8}Fe_{0.1}Al_{0.025}Mg_{0.05}PO_4$,
$Li_{1.025}Co_{0.9}Al_{0.025}Mg_{0.05}PO_4$,
$Li_{1.025}Co_{0.75}Fe_{0.15}Al_{0.025}Mg_{0.025}PO_4$,
$LiCo_{0.75}Fe_{0.15}Al_{0.025}Ca_{0.05}PO_{3.975}F_{0.025}$,
$LiCo_{0.9}Al_{0.025}Mg_{0.05}PO_{3.975}F_{0.025}$,
$Li_{0.75}Co_{0.625}Al_{0.25}PO_{3.75}F_{0.25}$,
$Li_{1.075}Co_{0.8}Cu_{0.05}Mg_{0.025}Al_{0.05}PO_{3.975}F_{0.025}$,
$Li_{1.075}Fe_{0.8}Mn_{0.075}Al_{0.05}PO_{3.975}F_{0.025}$,
$Li_{1.075}Co_{0.8}Mg_{0.075}Al_{0.05}PO_{3.975}F_{0.025}$,
$Li_{1.025}Co_{0.8}Mg_{0.1}Al_{0.05}PO_{3.975}F_{0.025}$,
$LiCo_{0.7}Fe_{0.2}Al_{0.025}Mg_{0.05}PO_{3.975}F_{0.025}$,
$Li_2Fe_{0.8}Mg_{0.2}PO_4F$; $Li_2Fe_{0.5}Co_{0.5}PO_4F$; $Li_3CoPO_4F_2$; $KFe(PO_3F)F$; $Li_2Co(PO_3F)Br_2$; $Li_2Fe(PO_3F_2)F$; $Li_2FePO_4Cl$; $Li_2MnPO_4OH$; $Li_2CoPO_4F$; $Li_2Fe_{0.5}Co_{0.5}PO_4F$; $Li_2Fe_{0.9}Mg_{0.1}PO_4F$; $Li_2Fe_{0.8}Mg_{0.2}PO_4F$; $Li_{1.25}Fe_{0.9}Mg_{0.1}PO_4F_{0.25}$; $Li_2MnPO_4F$; $Li_2CoPO_4F$; $K_2Fe_{0.9}Mg_{0.1}P_{0.5}As_{0.5}O_4F$; $Li_2MnSbO_4OH$; $Li_2Fe_{0.6}Co_{0.4}SbO_4Br$; $Na_3CoAsO_4F_2$; $LiFe(AsO_3F)Cl$; $Li_2Co(As_{0.5}Sb_{0.5}O_3F)F_2$; $K_2Fe(AsO_3F_2)F$; $Li_2NiSbO_4F$; $Li_2FeAsO_4OH$; $Li_4Mn_2(PO_4)_3F$; $Na_4FeMn(PO_4)_3OH$; $Li_4FeV(PO_4)_3Br$; $Li_3VAl(PO_4)_3F$; $K_3VAl(PO_4)_3Cl$; $LiKNaTiFe(PO_4)_3F$; $Li_4Ti_2(PO_4)_3Br$; $Li_3V_2(PO_4)_3F_2$; $Li_6FeMg(PO_4)_3OH$; $Li_4Mn_2(AsO_4)_3F$; $K_4FeMn(AsO_4)_3OH$; $Li_4FeV(P_{0.5}Sb_{0.5}O_4)_3Br$; $LiNaKAlV(AsO_4)_3F$; $K_3VAl(SbO_4)_3Cl$; $Li_3TiV(SbO_4)_3F$; $Li_2FeMn(P_{0.5}As_{0.5}O_3F)_3$; $Li_4Ti_2(PO_4)_3F$; $Li_{3.25}V_2(PO_4)_3F_{0.25}$; $Li_3Na_{0.75}Fe_2(PO_4)_3F_{0.75}$; $Na_{6.5}Fe_2(PO_4)_3(OH)Cl_{0.5}$; $K_8Ti_2(PO_4)_3F_3Br_2$; $K_8Ti_2(PO_4)_3F_5$; $Li_4Ti_2(PO_4)_3F$; $LiNa_{1.25}V_2(PO_4)_3F_{0.5}Cl_{0.75}$; $K_{3.25}Mn_2(PO_4)_3OH_{0.25}$; $LiNa_{1.25}KTiV(PO_4)_3(OH)_{1.25}Cl$; $Na_8Ti_2(PO_4)_3F_3Cl_2$; $Li_7Fe_2(PO_4)_3F_2$; $Li_8FeMg$ $(PO_4)_3F_{2.25}Cl_{0.75}$; $Li_5Na_{2.5}TiMn(PO_4)_3(OH)_2Cl_{0.5}$; $Na_3K_{4.5}MnCa(PO_4)_3(OH)_{1.5}Br$; $K_9FeBa(PO_4)_3F_2Cl_2$; $Li_7Ti_2(SiO_4)_2(PO_4)F_2$; $Na_8Mn_2(SiO_4)_2(PO_4)F_2Cl$; $Li_3K_2V_2(SiO_4)_2(PO_4)(OH)Cl$; $L_4Ti_2(SiO_4)_2(PO_4)(OH)$; $Li_2NaKV_2(SiO_4)_2(PO_4)F$; $Li_5TiFe(PO_4)_3F$; $Na_4K_2VMg(PO_4)_3FCl$; $Li_4NaAlNi(PO_4)_3(OH)$; $Li_4K_3FeMg(PO_4)_3F_2$; $Li_2Na_2K_2CrMn(PO_4)_3(OH)Br$; $Li_5TiCa(PO_4)_3F$; $Li_4Ti_{0.75}Fe_{1.5}(PO_4)_3F$; $Li_3NaSnFe(PO_4)_3(OH)$; $Li_3NaGe_{0.5}Ni_2(PO_4)_3(OH)$; $Na_3K_2VCo(PO_4)_3(OH)Cl$; $Li_4Na_2MnCa(PO_4)_3F(OH)$; $Li_3NaKTiFe(PO_4)_3F$; $Li_7FeCo(SiO_4)_2(PO_4)F$; $Li_3Na_3TiV(SiO_4)_2(PO_4)F$; $K_{5.5}CrMn(SiO_4)_2(PO_4)Cl_{0.5}$; $Li_3Na_{2.5}V_2(SiO_4)_2(PO_4)(OH)_{0.5}$; $Na_{5.25}FeMn(SiO_4)_2(PO_4)Br_{0.25}$; $Li_{6.5}VCo(SiO_4)_{2.5}(PO_4)_{0.5}F$; $Na_{7.25}V_2(SiO_4)_{2.25}(PO_4)_{0.75}F_2$; $Li_4NaVTi(SiO_4)_3F_{0.5}Cl_{0.5}$; $Na_2K_{2.5}ZrV(SiO_4)_3F_{0.5}$; $Li_4K_2MnV(SiO_4)_3(OH)_2$; $Li_3Na_3KTi_2(SiO_4)_3F$; $K_6V_2(SiO_4)_3(OH)Br$; $Li_8FeMn(SiO_4)_3F_2$; $Na_3K_{4.5}MnNi(SiO_4)_3(OH)_{1.5}$; $Li_3Na_2K_2TiV(SiO_4)_3(OH)_{0.5}Cl_{0.5}$; $K_9VCr(SiO_4)_3F_2Cl$; $Li_4Na_4V_2(SiO_4)_3FBr$; $Li_4FeMg(SO_4)_3F_2$; $Na_2KNiCo(SO_4)_3(OH)$; $Na_5MnCa(SO_4)_3F_2Cl$; $Li_3NaCoBa(SO_4)_3FBr$; $Li_{2.5}K_{0.5}FeZn(SO_4)_3F$; $Li_3MgFe(SO_4)_3F_2$; $Li_2NaCaV(SO_4)_3FCl$; $Na_4NiMn(SO_4)_3(OH)_2$; $Na_2KBaFe(SO_4)_3F$; $Li_2KCuV(SO_4)_3(OH)Br$; $Li_{1.5}CoPO_4F_{0.5}$; $Li_{1.25}CoPO_4F_{0.25}$; $Li_{1.75}FePO_4F_{0.75}$; $Li_{1.66}MnPO_4F_{0.66}$; $Li_{1.5}Co_{0.75}Ca_{0.25}PO_4F_{0.5}$; $Li_{1.75}Co_{0.8}Mn_{0.2}PO_4F_{0.75}$; $Li_{1.25}F_{0.75}Mg_{0.25}PO_4F_{0.25}$; $Li_{1.66}Co_{0.6}Zn_{0.4}PO_4F_{0.66}$; $KMn_2SiO_4Cl$; $Li_2VSiO_4(OH)_2$; $Li_3CoGeO_4F$; $LiMnSO_4F$; $NaFe_{0.9}Mg_{0.1}SO_4Cl$; $LiFeSO_4F$; $LiMnSO_4OH$; $KMnSO_4F$; $Li_{1.75}Mn_{0.8}Mg_{0.2}PO_4F_{0.75}$; $Li_3FeZn(PO_4)F_2$; $Li_{0.5}V_{0.75}Mg_{0.5}(PO_4)F_{0.75}$; $Li_3V_{0.5}Al_{0.5}(PO_4)F_{3.5}$; $Li_{0.75}VCa(PO_4)F_{1.75}$; $Li_4CuBa(PO_4)F_4$; $Li_{0.5}V_{0.5}Ca(PO_4)(OH)_{1.5}$; $Li_{1.5}FeMg(PO_4)(OH)Cl$; $LiFeCoCa(PO_4)(OH)_3F$; $Li_3CoBa(PO_4)(OH)_2Br_2$; $Li_{0.75}Mn_{1.5}Al(PO_4)(OH)_{3.75}$; $Li_2Co_{0.75}Mg_{0.25}(PO_4)F$; $LiNaCo_{0.8}Mg_{0.2}(PO_4)F$; $NaKCo_{0.5}Mg_{0.5}(PO_4)F$; $LiNa_{0.5}K_{0.5}Fe_{0.75}Mg_{0.25}(PO_4)F$; $Li_{1.5}K_{0.5}V_{0.5}Zn_{0.5}(PO_4)F_2$; $Na_6Fe_2Mg(PS_4)_3(OH_2)Cl$; $Li_4Mn_{1.5}Co_{0.5}(PO_3F)_3(OH)_{3.5}$; $K_8FeMg(PO_3F)_3F_3Cl_3Li_5Fe_2Mg(SO_4)_3Cl_5$; $LiTi_2(SO_4)_3Cl$; $LiMn_2(SO_4)_3F$; $Li_3Ni_2(SO_4)_3Cl$; $Li_3Co_2(SO_4)_3F$; $Li_3Fe_2(SO_4)_3Br$; $Li_3Mn_2(SO_4)_3F$; $Li_3MnFe(SO_4)_3F$; $Li_3NiCo(SO_4)_3Cl$; $LiMnSO_4F$; $LiFeSO_4Cl$; $LiNiSO_4F$; $LiCoSO_4Cl$; $LiMn_{1-x}Fe_xSO_4F$; $LiFe_{1-x}Mg_xSO_4F$; $Li_7ZrMn(SiO_4)_3F$; $Li_7MnCo(SiO_4)_3F$; $Li_7MnNi(SiO_4)_3F$; $Li_7VAl(SiO_4)_3F$; $Li_5MnCo(PO_4)_2(SiO_4)F$; $Li_4VAl(PO_4)_2(SiO_4)F$; $Li_4MnV(PO_4)_2(SiO_4)F$; $Li_4VFe(PO_4)_2(SiO_4)F$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)_2F_3$; $LiV_{0.9}Al_{0.1}PO_4F$; $LiFePO_4F$; $LiTiPO_4F$; $LiCrPO_4F$; $LiFePO_4$; $LiFe_{0.9}Mg_{0.1}PO_4$; $LiFe_{0.8}Mg_{0.2}PO_4$; $LiFe_{0.9}Ca_{0.1}PO_4$; $LiFe_{0.8}Ca_{0.2}PO_4$; $LiFe_{0.8}Zn_{0.2}PO_4$; $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; $Li_3ZrMnSiP_2O_{12}$; $Li_3V_2SiP_2O_{12}$; $Li_3MnVSiP_2O_{12}$; $Li_3TiVSiP_2O_{12}$; $Li_3TiCrSiP_2O_{12}$; $Li_{3.5}AlVSi_{0.5}P_{2.5}O_{12}$; $Li_{3.5}AlVSi_{0.5}P_{2.5}O_{12}$; $Li_{2.5}AlCrSi_{0.5}P_{2.5}O_{12}$; $Li_{2.5}V_2P_3O_{11.5}F_{0.5}$; $Li_2V_2P_3O_{11}F$; $Li_{2.5}VMnP_3O_{11.5}F_{0.5}$; $Li_2V_{0.5}Fe_{1.5}P_3O_{11}F$; $Li_3V_{0.5}V_{1.5}P_3O_{11.5}F_{0.5}$; $Li_3V_2P_3O_{11}F$; $Li_3Mn_{0.5}V_{1.5}P_3O_{11}F_{0.5}$; $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Ti_{0.025}Al_{0.025}Mg_{0.025}PO_4$, $Li_{1.025}Co_{0.8}Fe_{0.1}Ti_{0.025}Mg_{0.05}PO_4$, $Li_{1.025}Co_{0.8}Fe_{0.1}Ti_{0.025}Al_{0.025}Mg_{0.025}PO_4$, $LiCo_{0.8}Fe_{0.1}Ti_{0.05}Mg_{0.05}PO_4$, and mixtures thereof. Preferred active materials include $LiFePO_4$; $LiFe_{0.9}Mg_{0.1}PO_4$; $LiFe_{0.8}Mg_{0.2}PO_4$; $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; and mixtures thereof. A particularly preferred active material is $LiCo_{0.8}Fe_{0.1}Al_{0.025}Mg_{0.05}PO_{3.975}F_{0.025}$.

Methods of Manufacture:

Active materials of general formula $A_aM_b(XY_4)_cZ_d$ are readily synthesized by reacting starting materials in a solid state reaction, with or without simultaneous oxidation or reduction of the metal species involved. According to the desired values of a, b, c, and d in the product, starting materials are chosen that contain "a" moles of alkali metal A from all sources, "b" moles of metals M from all sources, "c" moles of phosphate (or other $XY_4$ species) from all sources, and "d" moles of halide or hydroxide Z, again taking into account all sources. As discussed below, a particular starting material may be the source of more than one of the components A, M, $XY_4$, or Z. Alternatively it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide exact molar amounts of all the starting materials.

In one aspect, the moiety $XY_4$ of the active material comprises a substituted group represented by $X'O_{4-x}Y'_x$, where x is less than or equal to 1, and preferably less than or equal to about 0.1. Such groups may be synthesized by providing starting materials containing, in addition to the alkali metal and other metals, phosphate or other $X'O_4$ material in a molar amount equivalent to the amount necessary to produce a reaction product containing $X'O_4$. Where Y' is F, the starting materials further comprise a source of fluoride in a molar amount sufficient to substitute F in the product as shown in the formula. This is generally accomplished by including at least "x" moles of F in the starting materials. For embodiments where d>0, the fluoride source is used in a molar limiting quantity such that the fluorine is incorporated as a Z-moiety. Sources of F include ionic compounds containing fluoride ion ($F^-$) or hydrogen difluoride ion ($HF_2^-$). The cation may be any cation that forms a stable compound with the fluoride or hydrogen difluoride anion. Examples include +1, +2, and +3 metal cations, as well as ammonium and other nitrogen-containing cations. Ammonium is a preferred cation because it tends to form volatile by-products that are readily removed from the reaction mixture.

Similarly, to make $X'O_{4-x}N_x$, starting materials are provided that contain "x" moles of a source of nitride ion. Sources of nitride are among those known in the art including nitride salts such as $Li_3N$ and $(NH_4)_3N$.

It is preferred to synthesize the active materials of the invention using stoichiometric amounts of the starting materials, based on the desired composition of the reaction product expressed by the subscripts a, b, c, and d above. Alternatively it is possible to run the reaction with a stoichiometric excess of one or more of the starting materials. In such a case, the stoichiometry of the product will be determined by the limiting reagent among the components. There will also be at least some unreacted starting material in the reaction product mixture. Because such impurities in the active materials are generally undesirable (with the exception of reducing carbon, discussed below), it is generally preferred to provide relatively exact molar amounts of all the starting materials.

The sources of components A, M, phosphate (or other $XY_4$ moiety) and optional sources of F or N discussed above, and optional sources of Z may be reacted together in the solid state while heating for a time and at a temperature sufficient to make a reaction product. The starting materials are provided in powder or particulate form. The powders are mixed together with any of a variety of procedures, such as by ball milling, blending in a mortar and pestle, and the like. Thereafter the mixture of powdered starting materials may be compressed into a pellet and/or held together with a binder material to form a closely cohering reaction mixture. The reaction mixture is heated in an oven, generally at a temperature of about 400° C. or greater until a reaction product forms.

Another means for carrying out the reaction at a lower temperature is a hydothermal method. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

The reaction may be carried out without redox, or if desired, under reducing or oxidizing conditions. When the reaction is carried out under reducing conditions, at least some of the transition metals in the starting materials are reduced in oxidation state. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in situ by including in the reaction mixture a reductant that will participate in the reaction to reduce a metal M, but that will produce by-products that will not interfere with the active material when used later in an electrode or an electrochemical cell. The reductant is described in greater detail below.

Sources of alkali metal include any of a number of salts or ionic compounds of lithium, sodium, potassium, rubidium or cesium. Lithium, sodium, and potassium compounds are preferred, with lithium being particularly preferred. Preferably, the alkali metal source is provided in powder or particulate form. A wide range of such materials is well known in the field of inorganic chemistry. Examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M, $M^1$, $M^2$, $M^3$, and $M^4$ include salts or compounds of any of the transition metals, alkaline earth metals, or lanthanide metals, as well as of non-transition elements such as boron, aluminum, gallium, indium, thallium, germanium, tin, lead, antimony, and bismuth. The metal salts or compounds include fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used. The metal M in the starting material may have any oxidation state, depending on the oxidation state required in the desired product and the oxidizing or reducing conditions contemplated, as discussed below. In particular, the cobalt and iron of the active materials may be provided by starting materials with $Co^{+2}$, $Co^{+3}$, $Fe^{+2}$, or $Fe^{+3}$. The metal sources are chosen so that at least one metal in the final reaction product is capable of being in an oxidation state higher than it is in the reaction product. In a preferred embodiment, the metal sources also include a +2 non-transition metal. Also preferably, at least one metal source is a source of a +3 non-transition metal. In embodiments comprising Ti, a source of Ti is provided in the starting materials and the compounds are made using reducing or non-reducing conditions depending on the other components of the product and the desired oxidation state of Ti and other metals in the final product. Suitable Ti-containing precursors include $TiO_2$, $Ti_2O_3$, and TiO.

Sources of the desired starting material anions, such as phosphates, halides and hydroxides, are provided by a number of salts or compounds containing positively charged cations in addition to a source of phosphate (or other $XY_4$ species), halide, or hydroxide. Such cations include metal ions such as the alkali metals, alkaline metals, transition metals, or other non-transition elements, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate or other $XY_4$ species, halide and hydroxide starting materials are preferably provided in particulate or powder form. Hydrates of any of the above may be used, as can mixtures of the above.

As noted above, the active materials $A_aM_b(XY_4)_cZ_d$ of the invention can contain a mixture of alkali metals A, a mixture of metals M, a phosphate group representative of the $XY_4$ group in the formula and, optionally, a halide or hydroxide Z. In another aspect of the invention, the phosphate group can be completely or partially substituted by a number of other $XY_4$ moieties, which will also be referred to as "phosphate replacements" or "modified phosphates." Thus, active materials are provided according to the invention wherein the $XY_4$ moiety is a phosphate group that is completely or partially replaced by such moieties as sulfate $(SO_4)^{2-}$, monofluoromonophosphate $(PO_3F)^{2-}$, difluoromonophosphate $(PO_2F)^{2-}$, silicate $(SiO_4)^{4-}$, arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$. They are most conveniently available as the sodium, lithium, or potassium derivative.

To synthesize the active materials containing the modified phosphate moieties, it is usually possible to substitute all or preferably only part of the phosphate compounds discussed above with a source of the replacement anion. The replacement is considered on a stoichiometric basis. Starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or any of the other metals may be a part of the modified phosphate compound.

Non-limiting examples of sources of monofluoromonophosphates include $Na_2PO_3F$, $K_2PO_3F$, $(NH_4)_2PO_3F.H_2O$, $LiNaPO_3F.H_2O$, $LiKPO_3F$, $LiNH_4PO_3F$, $NaNH_4PO_3F$, $NaK_3(PO_3F)_2$ and $CaPO_3F.2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially or completely replace phosphorous in the active materials with silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Partial substitution of silicate for phosphate is illustrated in Example 4.

Representative arsenate compounds that may be used to prepare the active materials of the invention include $H_3AsO_4$ and salts of the anions $[H_2AsO_4]^-$ and $[HAsO_4]^{2-}$. Sources of antimonate in the active materials can be provided by antimony-containing materials such as $Sb_2O_5$, $M^ISbO_3$ where $M^I$ is a metal having oxidation state +1, $M^{III}SbO_4$ where $M^{III}$ is a metal having an oxidation state of +3, and $M^{II}Sb_2O_7$ where $M^{II}$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it generally suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

A starting material may provide more than one of the components A, M, $XY_4$, and Z, as is evident in the list above. In various embodiments of the invention, starting materials are provided that combine, for example, the metal and the phosphate, thus requiring only the alkali metal to be added. In one embodiment, a starting material is provided that contains alkali metal, metal, and phosphate. As a general rule, there is flexibility to select starting materials containing any of the components of alkali metal A, metal M, and phosphate (or other $XY_4$ moiety), as well as halide or hydroxide Z, depending on availability. Combinations of starting materials providing each of the components may also be used.

In general, any anion may be combined with the alkali metal cation to provide the alkali metal source starting material, or with a metal M cation to provide a metal starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to the formation of volatile by-products during the solid state reaction. Thus, it is desirable to choose ammonium salts, carbonates, bicarbonates, oxides, hydroxides, and the like where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products.

As noted above, the reactions may be carried out without reduction, or in the presence of a reductant. In one aspect, the reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide.

The starting materials containing transition metal compounds are mixed together with carbon, which is included in an amount sufficient to reduce the metal ion of one or more of the metal-containing starting materials without full reduction to an elemental metal state. (Excess quantities of the reducing carbon may be used to enhance product quality.) An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. In a preferred embodiment, the carbon present during compound formation is intimately dispersed throughout the precursor and product. This provides many advantages, including the enhanced conductivity of the product. In a preferred embodiment, the presence of carbon particles in the starting materials also provides nucleation sites for the production of the product crystals.

Alternatively or in addition, the source of reducing carbon may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include pyrolization, carbonization, coking, destructive distillation, and the like. These process names, as well as the term thermal decomposition, are used interchangeably in this application to refer to the process by which a decomposition product capable of acting as a reductant is formed upon heating of a reaction mixture containing an organic material.

A typical decomposition product contains carbonaceous material. During reaction in a preferred embodiment, at least a portion of the carbonaceous material formed participates as a reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction.

In a preferred embodiment, some of the organic material providing reducing power is oxidized to a non-volatile component, such as for example, oxygen-containing carbon materials such as alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will preferably be enriched in carbon relative to the mole per cent carbon present in the organic material. The carbonaceous material preferably contains from about 50 up to about 100 mole percent carbon.

While in some embodiments the organic precursor material forms a carbonaceous decomposition product that acts as a reductant as discussed above with respect to elemental carbon, in other embodiments a portion of the organic material may participate as reductant without first undergoing a decomposition. The invention is not limited by the exact mechanism or mechanisms of the underlying reduction processes.

As with elemental carbon, reactions with the organic precursor material are conveniently carried out by combining starting materials and heating. The starting materials include at least one transition metal compound as noted above. For convenience, it is preferred to carry out the decomposition of the organic material and the reduction of a transition metal in one step. In this embodiment, the organic material decomposes in the presence of the transition metal compound to form a decomposition product capable of acting as a reductant, which reacts with the transition metal compound to form a reduced transition metal compound. In another embodiment, the organic material may be decomposed in a separate step to form a decomposition product. The decomposition product may then be combined with a transition metal compound to form a mixture. The mixture may then be heated for a time and at a temperature sufficient to form a reaction product comprising a reduced transition metal compound.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as halogens, oxygen, nitrogen, phosphorus, and sulfur, may be present in the organic material, as long as they do not significantly interfere with the decomposition process or otherwise prevent the reductions from being carried out. Precursors include organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include starch, cellulose, and their ether or ester derivatives. Other derivatives include the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ include ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include sucrose, maltose, lactose, trehalose, gentiobiose, cellobiose, and melibiose. Three-ring (trisaccharides such as raffinose) and higher oligomeric and polymer carbohydrates may also be used. Examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as glycerol, sorbitol, mannitol, iditol, dulcitol, talitol, arabitol, xylitol, and adonitol, as well as "slightly oxidized" carbohydrates such as gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150-180° C. Preferably, the liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The reaction proceeds with carbothermal reduction. The liquid precursor materials may also advantageously serve or function as a binder in the starting material mixture as noted above.

Reducing carbon is preferably used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is generally higher than 14. For example, in carbohydrates it is about 30 g/equivalent. Examples of carbohydrates include sugars such as glucose, fructose, and sucrose, as well as polymers such as cellulose and starch.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

In a preferred embodiment, reduction is carried out in a reducing atmosphere in the presence of a reductant as discussed above. The term "reducing atmosphere" as used herein means a gas or mixture of gases that is capable of providing reducing power for a reaction that is carried out in the atmosphere. Reducing atmospheres preferably contain one or more so-called reducing gases. Examples of reducing gases include hydrogen, carbon monoxide, methane, and ammonia, as well as mixtures thereof. Reducing atmospheres also preferably have little or no oxidizing gases such as air or oxygen. If any oxidizing gas is present in the reducing atmosphere, it is preferably present at a level low enough that it does not significantly interfere with any reduction processes taking place.

The stoichiometry of the reduction can be selected along with the relative stoichiometric amounts of the starting components A, M, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon or an organic material, any excess reducing agent does not present a problem. In the former case, the gas is volatile and is easily separated from the reaction mixture, while in the latter, the excess carbon in the reaction product does not harm the properties of the active material, particularly in embodiments where carbon is added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

When using a reducing atmosphere, it is difficult to provide less than an excess of reducing gas such as hydrogen. Under such as a situation, it is preferred to control the stoichiometry of the reaction by the other limiting reagents. Alternatively the reduction may be carried out in the presence of reducing carbon such as elemental carbon. Experimentally, it would be possible to use precise amounts of reductant carbon to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

Before reacting the mixture of starting materials, the particles of the starting materials are intermingled. Preferably, the starting materials are in particulate form, and the intermingling results in an essentially homogeneous powder mixture of the precursors. In one embodiment, the precursor powders are dry-mixed using, for example, a ball mill. Then the mixed powders are pressed into pellets. In another embodiment, the precursor powders are mixed with a binder. The binder is preferably selected so as not to inhibit reaction between particles of the powders. Preferred binders decompose or evaporate at a temperature less than the reaction temperature. Examples include mineral oils, glycerol, and polymers that decompose or carbonize to form a carbon residue before the reaction starts, or that evaporate before the reaction starts. In one embodiment, the binders used to hold the solid particles also function as sources of reducing carbon, as described above. In still another embodiment, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials include a reducing agent, the reaction product is a transition metal compound having at least one transition metal in a lower oxidation state relative to its oxidation state in the starting materials.

Preferably, the particulate starting materials are heated to a temperature below the melting point of the starting materials. Preferably, at least a portion of the starting material remains in the solid state during the reaction.

The temperature should preferably be about 400° C. or greater, and desirably about 450° C. or greater, and preferably about 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than about 600° C.; most desirably greater than about 650° C.; preferably about 700° C. or greater; more preferably about 750° C. or greater. Suitable ranges for many reactions are from about 700 to about 950° C., or from about 700 to about 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than about 1200° C. are not thought to be needed.

In one embodiment, the methods of this invention utilize the reducing capabilities of carbon in a unique and controlled manner to produce desired products having structure and alkali metal content suitable for use as electrode active materials. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state.

Referring back to the discussion of temperature, at about 700° C. both the carbon to carbon monoxide and the carbon to carbon dioxide reactions are occurring. At closer to about 600° C. the C to $CO_2$ reaction is the dominant reaction. At closer to about 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a preheated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

After reaction, the products are preferably cooled from the elevated temperature to ambient (room) temperature (i.e., about 10° C. to about 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

The general aspects of the above synthesis routes are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrodes:

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(1) from about 25% to about 95%, more preferably from about 50% to about 90%, active material;
(2) from about 2% to about 95% electrically conductive material (e.g., carbon black); and
(3) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries:

The batteries of the present invention comprise:
(1) a first electrode comprising an active material of the present invention;
(2) a second electrode which is a counter-electrode to said first electrode; and
(3) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:
(1) from about 0% to about 95%, preferably from about 25% to about 95%, more preferably from about 50% to about 90%, of an insertion material;
(2) from about 2% to about 95% electrically conductive material (e.g., carbon black); and
(3) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:
(1) from about 25% to about 95%, more preferably from about 50% to about 90%, active material;
(2) from about 2% to about 95% electrically conductive material (e.g., carbon black); and
(3) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where $0<m<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides a physical separation but allows transfer of ions between the cathode and anode. The electrolyte is preferably a material that exhibits high ionic conductivity, as well as having insular properties to prevent self-discharging during storage. The electrolyte can be either a liquid or a solid. A liquid electrolyte comprises a solvent and an alkali metal salt that together form an ionically conducting liquid. So called "solid electrolytes" contain in addition a matrix material that is used to separate the electrodes.

One preferred embodiment is a solid polymeric electrolyte, made up of a solid polymeric matrix and a salt homogeneously dispersed via a solvent in the matrix. Suitable solid polymeric matrices include those well known in the art and include solid matrices formed from organic polymers, inorganic polymers or a solid matrix-forming monomer and from partial polymers of a solid matrix forming monomer.

In another variation, the polymer, solvent and salt together form a gel which maintains the electrodes spaced apart and provides the ionic conductivity between electrodes. In still another variation, the separation between electrodes is provided by a glass fiber mat or other matrix material and the solvent and salt penetrate voids in the matrix.

The electrolytes of the present invention comprise a salt dissolved in a mixture of an alkylene carbonate and a cyclic ester. Preferably, the salt of the electrolyte is a lithium or sodium salt. Such salts among those useful herein include $LiAsF_6$, $LiPF_6$, $LiClO_4$, $LiB(C_6H_5)_4$, $LiAlCl_4$, $LiBr$, $LiBF_4$, $LiSO_3CF_3$, $LiN(SO_2CF_3)_2$, $LiN(SO_2C_2F_5)_2$, and mixtures thereof, as well as sodium analogs, with the less toxic salts being preferable. The salt content is preferably from about 5% to about 65%, preferably from about 8% to about 35% (by weight of electrolyte). A preferred salt is $LiBF_4$. In a preferred embodiment, the $LiBF_4$ is present at a molar concentration of from 0.5M to 3M, preferably 1.0M to 2.0M, and most preferably about 1.5M. Electrolyte compositions comprising salts among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; U.S. Pat. No. 6,103,419, Saidi et al., issued Aug. 15, 2000; and PCT Application WO 01/24305, Barker et al., published Apr. 5, 2001; all of which are incorporated by reference herein.

The electrolyte solvent contains a blend of a cyclic ester with an alkylene carbonate, an alkyl carbonate, or mixtures thereof. The alkylene carbonates (cyclic carbonates) have a preferred ring size of from 5 to 8. The carbon atoms of the ring may be optionally substituted with alkyl groups, preferably lower alkyl ($C_1$-$C_6$) chains. Examples of unsubstituted cyclic carbonates are ethylene carbonate (5-membered ring), 1,3-propylene carbonate (6-membered ring), 1,4-butylene carbonate (7-membered ring), and 1,5-pentylene carbonate (8-membered ring). Optionally the rings may be substituted with lower alkyl groups, preferably methyl, ethyl, propyl, or isopropyl groups. Such structures are well known; examples include a methyl substituted 5-membered ring (also known as 1,2-propylene carbonate, or simply propylene carbonate (PC)), and a dimethyl substituted 5-membered ring carbonate (also known as 2,3-butylene carbonate) and an ethyl substituted 5-membered ring (also known as 1,2-butylene carbonate or simply butylene carbonate (BC). Other examples include a wide range of methylated, ethylated, and propylated 5-8 membered ring carbonates. In a preferred embodiment, the first component is a 5- or 6-membered ring carbonate. More preferably, the cyclic carbonate has a 5-membered ring. In a particular preferred embodiment, the alkylene carbonate comprises ethylene carbonate.

The alkyl carbonates are preferably $C_1$-$C_6$ alkyl, which may be unsubstituted or substituted on one or more carbon atoms with $C_1$-$C_4$ alkyl. Alkyl carbonates among those useful herein include diethyl carbonate (DEC), dimethyl carbonate (DMC), dipropyl carbonate (DPC), ethyl methyl carbonate (EMC), and mixtures. DEC is a preferred alkyl carbonate.

The carbonate component of the electrolyte solvent may comprise an alkylene carbonate, an alkyl carbonate or mixtures thereof. Preferably, the carbonate is an alkylene carbonate.

The electrolyte solvent also comprises a cyclic ester, preferably a lactone. Preferred cyclic esters include those with ring sizes of 4 to 7. The carbon atoms in the ring may be optionally substituted with alkyl groups, preferably lower alkyl ($C_1$-$C_6$) chains. Examples of unsubstituted cyclic esters include the 4-membered β-propiolactone (or simply propiolactone); γ-butyrolactone (5-membered ring), δ-valerolactone (6-membered ring) and ε-caprolactone (7-membered ring). Any of the positions of the cyclic esters may be optionally substituted, preferably by methyl, ethyl, propyl, or isopropyl groups. Thus, preferred second components include one or more solvents selected from the group of unsubstituted, methylated, ethylated, or propylated lactones selected from the group consisting of propiolacone, butyrolactone, valerolactone, and caprolactone. (It will be appreciated that some of the alkylated derivatives of one lactone may be named as a different alkylated derivative of a different core lactone. To illustrate, γ-butyrolactone methylated on the γ-carbon may be named as γ-valerolactone.)

In a preferred embodiment, the cyclic ester of the second component has a 5- or 6-membered ring. Thus, preferred second component solvents include one or more compounds selected from γ-butyrolactone (gamma-butyrolactone), and δ-valerolactone, as well as methylated, ethylated, and propylated derivatives. Preferably, the cyclic ester has a 5-membered ring. In a particular preferred embodiment, the second component cyclic ester comprises γ-butyrolactone.

The preferred two component solvent system contains the two components in a weight ratio of from about 1:20 to a ratio of about 20:1. More preferably, the ratios range from about 1:10 to about 10:1 and more preferably from about 1:5 to about 5:1. In a preferred embodiment the cyclic ester is present in a higher amount than the cyclic carbonate. Preferably, at least about 60% (by weight) of the two component system is made up of the cyclic ester, and preferably about 70% or more. In a particularly preferred embodiment, the ratio of cyclic ester to cyclic carbonate is about 3 to 1. In one embodiment, the solvent system is made up essentially of γ-butyrolactone and ethylene carbonate. A preferred solvent system thus contains about 3 parts by weight γ-butyrolactone and about 1 part by weight ethylene carbonate. The preferred salt and solvent are used together in a preferred mixture comprising about 1.5 molar $LiBF_4$ in a solvent comprising about 3 parts γ-butyrolactone and about 1 part ethylene carbonate by weight.

The solvent optionally comprises additional solvents. Such solvents include low molecular weight organic solvents. The optional solvent is preferably a compatible, relatively non-volatile, aprotic, polar solvent. Examples of such optional solvents among those useful herein include ethers such as diglyme, triglyme, and tetraglyme; dimethylsulfoxide, dioxolane, sulfolane, and mixtures thereof.

A separator allows the migration of ions while still providing a physical separation of the electric charge between the electrodes, to prevent short-circuiting. The polymeric matrix itself may function as a separator, providing the physical isolation needed between the anode and cathode. Alternatively, the electrolyte can contain a second or additional polymeric material to further function as a separator. In a preferred embodiment, the separator prevents damage from elevated temperatures within the battery that can occur due to uncontrolled reactions preferably by degrading upon high temperatures to provide infinite resistance to prevent further uncontrolled reactions.

A separator membrane element is generally polymeric and prepared from a composition comprising a copolymer. A preferred composition contains a copolymer of about 75% to about 92% vinylidene fluoride with about 8% to about 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption. In a non-limiting example, a preferred electrolyte separator contains about two parts polymer per one part of fumed silica.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab, for a description of tabs and collectors. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, an electrode membrane comprising the electrode active material (e.g., an insertion material such as carbon or graphite or a insertion compound) is dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. No. 5,418,091, Gozdz et al., issued May 23, 1995; U.S. Pat. No. 5,460,904, Gozdz et al., issued Oct. 24, 1995; U.S. Pat. No. 5,456,000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The following non-limiting examples illustrate the compositions and methods of the present invention.

Example 1

An electrode active material of formula $Li_{1.025}Co_{0.9}Al_{0.025}Mg_{0.05}PO_4$, is made as follows. The following sources of Li, Co, Al, Mg, and phosphate are provided containing the respective elements in a molar ratio of 1.025: 0.9:0.025:0.05:1.

| | |
|---|---|
| (1) 0.05125 moles $Li_2CO_3$ (mol. wt. 73.88 g/mol) | 3.8 g |
| (2) 0.03 moles $Co_3O_4$ (240.8 g/mol) | 7.2 g |
| (3) 0.0025 motes $Al(OH)_3$ (78 g/mol) | 0.195 g |
| (4) 0.005 moles $Mg(OH)_2$ (58 g/mol) | 0.29 g |
| (5) 0.1 moles $(NH_4)_2HPO_4$ (132 g/mol) | 13.2 g |
| (6) 0.2 moles elemental carbon (12 g/mol) (>100% excess) | 2.4 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure. An electrode is made with 80% of the active material, 10% of Super P conductive carbon, and 10% poly vinylidene difluoride. A cell with that electrode as cathode and lithium metal as anode is constructed with an electrolyte comprising 1 M $LiBF_4$ dissolved in a 3:1 by weight mixture of γ-butyrolactone:ethylene carbonate. The active material exhibits a reversible capacity over 140 mAhg-1.

Example 2

An electrode active material of formula $Li_{1.025}Co_{0.85}Fe_{0.05}Al_{0.025}Mg_{0.05}PO_4$ ($LiCo_{0.85}Fe_{0.05}Al_{0.025}Mg_{0.05}Li_{0.025}PO_4$) is made as follows. The following sources of Li, Co, Fe, Al, Mg, and phosphate are provided containing the respective elements in a molar ratio of 1.025:0.85:0.05:0.025:0.05:1.

| | | |
|---|---|---|
| (1) | 0.05125 moles $Li_2CO_3$ (mol. wt. 73.88 g/mol) | 3.8 g |
| (2) | 0.02833 moles $Co_3O_4$ (240.8 g/mol) | 6.82 g |
| (3) | 0.0025 moles $Fe_2O_3$ (159.7 g/mol) | 0.4 g |
| (4) | 0.0025 moles $Al(OH)_3$ (78 g/mol) | 0.195 g |
| (5) | 0.005 moles $Mg(OH)_2$ (58 g/mol) | 0.29 g |
| (6) | 0.1 moles $(NH_4)_2HPO_4$ (132 g/mol) | 13.2 g |
| (7) | 0.2 moles elemental carbon (12 g/mol) (>100% excess) | 2.4 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure. An electrode is made with 80% of the active material, 10% of Super P conductive carbon, and 10% poly vinylidene difluoride. A cell with that electrode as cathode and a carbon intercalation anode is constructed with an electrolyte comprising 1 M $LiPF_6$ dissolved in a 2:1:1 by weight mixture of γ-butyrolactone:ethylene carbonate:dimethyl carbonate.

Example 3

An electrode active material of the formula $Li_{1.025}Co_{0.8}Fe_{0.1}Al_{0.025}Mg_{0.05}PO_4$ ($LiCo_{0.8}Fe_{0.1}Al_{0.025}Mg_{0.05}Li_{0.025}PO_4$) is made as follows. The following sources of Li, Co, Fe, Al, Mg, and phosphate are provided containing the respective elements in a molar ratio of 1.025:0.8:0.1:0.025:0.05:1.

| | | |
|---|---|---|
| (1) | 0.05125 moles $Li_2CO_3$ (mol. wt. 73.88 g/mol) | 3.8 g |
| (2) | 0.02667 moles $Co_3O_4$ (240.8 g/mol) | 6.42 g |
| (3) | 0.005 moles $Fe_2O_3$ (159.7 g/mol) | 0.8 g |
| (4) | 0.0025 moles $Al(OH)_3$ (78 g/mol) | 0.195 g |
| (5) | 0.005 moles $Mg(OH)_2$ (58 g/mol) | 0.29 g |
| (6) | 0.1 moles $(NH_4)_2HPO_4$ (132 g/mol) | 13.2 g |
| (7) | 0.2 moles elemental carbon (12 g/mol) (>100% excess) | 2.4 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure. An electrode is made with 80% of the active material, 10% of Super P conductive carbon, and 10% poly vinylidene difluoride. A cell with that electrode as cathode and a carbon intercalation anode is constructed with an electrolyte comprising 1 M $LiPF_6$ dissolved in a 3:1 by weight mixture of γ-butyrolactone:ethylene carbonate.

Example 4

An electrode active material of the formula $LiCo_{0.8}Fe_{0.1}Al_{0.025}Mg_{0.05}(PO_4)_{0.9}(SiO_4)_{0.1}$ is made as following sources Li, Co, Fe, Al, Mg, phosphate, and silicate are provided containing the respective elements in a molar ratio of 1:0.8:0.05:0.1:0.05:0.9:0.1.

| | | |
|---|---|---|
| (1) | 0.05 moles $Li_2CO_3$ (mol. wt. 73.88 g/mol) | 3.7 g |
| (2) | 0.08 moles $CoCO_3$ (118.9 g/mol) | 9.5 g |
| (3) | 0.0025 moles $Fe_2O_3$ (159.7 g/mol) | 0.4 g |
| (4) | 0.0025 moles $Al(OH)_3$ (78 g/mol) | 0.195 g |
| (5) | 0.005 moles $Mg(OH)_2$ (58 g/mol) | 0.29 g |
| (6) | 0.09 moles $(NH_4)_2HPO_4$ (132 g/mol) | 11.9 g |
| (7) | 0.01 moles $SiO_2$ (60.1 g/mol) | 0.6 g |
| (8) | 0.2 moles elemental carbon (12 g/mol) (excess) | 2.4 g |

The above amounts of starting materials are combined and ball milled to mix the particles. Note that the reducing carbon is present in approximately a 40-fold excess, relative to the 0.05 moles of iron in the iron III oxide to be reduced. Thereafter, the particle mixture is pelletized. The pelletized mixture is heated for 4-20 hours at 750° C. in an oven in an argon atmosphere. The sample is removed from the oven and cooled. An electrode is made with 80% of the active material, 10% of Super P conductive carbon, and 10% polyvinylidene difluoride. A cell with that electrode as cathode and a carbon intercalation anode is constructed with an electrolyte comprising 1 M $LiBF_4$ dissolved in 3:1 by weight mixture of γ-butyrolactone:ethylene carbonate.

Example 5

An electrode active material of the formula $LiCo_{0.8}Fe_{0.1}Al_{0.025}Mg_{0.05}PO_{3.975}F_{0.025}$ is made as follows. The following containing Li, Co, Fe, Al, Mg, phosphate, and fluoride are provided containing the respective elements in a molar ratio of 1.0:0.8:0.1:0.025:0.05:1.0:0.025.

| | | |
|---|---|---|
| (1) | 0.05 moles $Li_2CO_3$ (mol. wt. 73.88 g/mol), 0.1 mol Li | 3.7 g |
| (2) | 0.02667 moles $Co_3O_4$ (240.8 g/mol), 0.08 mol Co | 6.42 g |
| (3) | 0.005 moles $Fe_2O_3$ (159.7 g/mol), 0.01 mol Fe | 0.8 g |
| (4) | 0.0025 moles $Al(OH)_3$ (78 g/mol), 0.0025 mol Al | 0.195 g |
| (5) | 0.005 moles $Mg(OH)_2$ (58 g/mol), 0.005 mol Mg | 0.29 g |
| (6) | 0.1 moles $(NH_4)_2HPO_4$ (132 g/mol), 0.1 mol phosphate | 13.2 g |
| (7) | 0.00125 moles $NH_4HF_2$ (57 g/mol), 0.0025 mol F | 0.071 g |
| (8) | 0.2 moles elemental carbon (12 g/mol) (>100% excess) | 2.4 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure. An electrode is made with 80% of the active material, 10% of Super P conductive carbon, and 10% polyvinylidene difluoride. A cell with that electrode as cathode and a carbon intercalation anode is constructed with an electrolyte comprising 1 M $LiBF_4$ dissolved in a 3:1 mixture by weight of γ-butyrolactone:propylene carbonate.

Example 6

An electrode active material of the formula $LiFe_{0.9}Mg_{0.1}PO_4$ is made according to the following reaction scheme.

$$0.50Li_2CO_3 + 0.45Fe_2O_3 + 0.10Mg(OH)_2 + (NH_4)_2HPO_4 + 0.45C \rightarrow LiFe_{0.9}Mg_{0.1}PO_4 + 0.50CO_2 + 0.45CO + 2.0NH_3 + 1.6H_2O$$

A mixture of 36.95 g (0.50 mol) of $Li_2CO_3$, 71.86 g (0.45 mol) of $Fe_2O_3$, 5.83 g (0.10 mol) of 0.10 $Mg(OH)_2$, 132.06 g (1.0 mol) of $(NH_4)_2HPO_4$, and 10.8 g (0.90 g-mol, 100% excess) of carbon is made, using a mortar and pestle. The mixture is pelletized, and transferred to a temperature-controlled tube furnace equipped with an argon gas flow. The mixture is heated at a ramp rate of about 2° C./minute to an ultimate temperature of about 750° C. in the inert atmosphere and maintained at this temperature for about 8 hours. The product is then cooled to ambient temperature (about 22° C.). An electrode is made with 80% of the active material, 10% of Super P conductive carbon, and 10% polyvinylidene difluoride. A cell with that electrode as cathode and a carbon intercalation anode is constructed with an electrolyte comprising 1M $LiBF_4$ dissolved in a 4:1 mixture by weight of δ-valerolactone:ethylene carbonate.

Example 7

An electrode active material comprising $Li_{1.25}Fe_{0.9}Mg_{0.1}PO_4F_{0.25}$ is made according to the following reaction scheme.

$$LiFe_{0.9}Mg_{0.1}PO_4 + dLiF \rightarrow Li_{1+d}Fe_{0.9}Mg_{0.1}PO_4F_d$$

For d equal to 0.25, 1.082 grams of $LiFe_{0.9}Mg_{0.1}PO_4$ (made as in Example 6) and 0.044 grams of LiF are premixed and pelletized, transferred to an oven and heated to an ultimate temperature of 700° C. and maintained for 15 minutes at this temperature. The sample is cooled and removed from the oven. Almost no weight loss is recorded for the reaction, consistent with full incorporation of the lithium fluoride into the phosphate structure to make an active material of formula $Li_{1.25}Fe_{0.9}Mg_{0.1}PO_4F_{0.25}$. An electrode is made with 80% of the active material, 10% of Super P conductive carbon, and 10% polyvinylidene difluoride. A cell with that electrode as cathode and a carbon intercalation anode is constructed with an electrolyte comprising 1M $LiBF_4$ dissolved in a 3:1 mixture by weight of γ-butyrolactone:ethylene carbonate.

Example 8

An electrode active material comprising $NaVPO_4F$ is made according to the following reaction scheme.

$$0.5Na_2CO_3 + NH_4F + VPO_4 \rightarrow NaVPO_4F + NH_3 + 0.5CO_2 + 0.5H_2O$$

1.23 grams of $VPO_4$, 0.31 grams of $NH_4F$, and 0.45 grams $Na_2CO_3$ are premixed with approximately 20 milliliters of deionized water and transferred and sealed in a Parr Model 4744 acid digestion bomb, which is a Teflon lined stainless steel reaction vessel. The bomb is placed in an oven and heated to an ultimate temperature of 250° C. and maintained at this temperature for forty-eight hours. The sample is cooled to room temperature and removed for analysis. The sample is washed repeatedly with the deionized water to remove unreacted impurities and thereafter is dried in an argon atmosphere at 250° C. for an hour.

Example 9

An electrode active material comprising $Li_{2.025}Co_{0.9}Al_{0.025}Mg_{0.05}PO_4F$ is made as follows. (This Example shows the synthesis of a mixed metal active material containing lithium and three different metals, with two metals in a +2 and one metal in a +3 oxidation state). For A=Li, a=2.025, $M^1$=Co, $M^2$=Al, and $M^3$=Mg, the reaction proceeds according to the following scheme.

$$0.5125Li_2CO_3 + 0.3Co_3(PO_4)_2 \cdot 8H_2O + 0.0125Al_2O_3 + 0.05Mg(OH)_2 + LiF + 0.4NH_4H_2PO_4 \rightarrow Li_{2.025}Co_{0.9}Al_{0.025}Mg_{0.05}PO_4F + 0.5125CO_2 + 0.4NH_3 + 8.9H_2O.$$

Powdered starting materials are provided in the molar ratios indicated, mixed, pelletized, and heated in an oven at 750° C. for four hours to produce a reaction product. An electrode is made with 80% of the active material, 10% of Super P conductive carbon, and 10% polyvinylidene difluoride. A cell with that electrode as cathode and a carbon intercalation anode is constructed with an electrolyte comprising 1M $LiBF_4$ dissolved in a 3:2 mixture by weight of β-propiolactone:ethylene carbonate.

Example 10

An electrode active material comprising $Li_6V_2(PO_4)_3F$ is synthesized according to the equation $$3C + 2.5Li_2CO_3 + V_2O_5 + LiF + 3NH_4H_2PO_4 \rightarrow Li_6V_2(PO_4)_3F + 2.5CO_2 + 3NH_3 + 4.5H_2O + 3CO.$$

The equation presupposes that the carbothermal reaction proceeds with production of carbon monoxide. The carbon is provided in excess, in this case to reduce the vanadium +5 species all the way down to its lowest oxidation of +2. It is appreciated in the reaction scheme that such a reduction is possible because there is enough lithium in the reaction scheme that lithium is incorporated into the reaction product in an amount sufficient to neutralize the $[(PO_4)_3F]^{10-}$ group of the active material. An electrode is made with 80% of the active material, 10% of Super P conductive carbon, and 10% polyvinylidene difluoride. A cell with that electrode as cathode and a carbon intercalation anode is constructed with an electrolyte comprising 1M $LiBF_4$ dissolved in a 3:1 mixture by weight of γ-butyrolactone:ethylene carbonate.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:
1. A battery, comprising:
   (a) a first electrode comprising an active material of the formula:

$$Li_aCo_eFe_fM^1_gM^2_hM^3_iXY_4,$$

wherein:
   (i) $0 < a \leq 2$, $e > 0$, and $f > 0$;
   (ii) MI is one or more transition metals, where $g \geq 0$;
   (iii) M2 is one or more +2 oxidation state non-transition metals, where h is greater than $\geq 0$;
   (iv) M3 is one or more +3 oxidation state non-transition metals, where $0.01 \leq i \leq 0.2$; and
   (v) $XY_4$ is selected from the group consisting of $X'O_{4-x}Y'_x$, $X'O_{4-y}Y'_{2y}$, $X''S_4$ and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is selected from the group consisting of halogen, S, N, and mixtures thereof; $0 \leq x \leq 3$; and $0 < y \leq 2$; and (vi) wherein $(e+f+g+h+i)<2$, and $M^1$, $M^2$, $M^3$, $XY_4$, a, e, f, g, h, x, and y are selected so as to maintain electroneutrality of the active material; and (b) a second electrode which is a counter-electrode to the first electrode; and (c) an electrolyte comprising an electrolyte salt, a cyclic ester and a carbonate selected from the group consisting of alkyl carbonates, alkylene carbonates, and mixtures thereof.

2. The battery according to claim 1, wherein $0.01 \leq g \leq 0.5$.

3. The battery according to claim 2, wherein $M^1$ is selected from the group consisting of Ti, V, Cr, Mn, Ni, Cu and mixtures thereof.

4. The battery according to claim 3, wherein $M^1$ is selected from the group consisting of Mn, Ti, and mixtures thereof.

5. The battery according to claim 1, wherein $0.01 \leq h \leq 0.2$.

6. The battery according to claim 5, wherein $M^2$ is selected from the group consisting of Be, Mg, Ca, Sr, Ba, and mixtures thereof.

7. The battery according to claim 6, wherein $M^2$ is Mg.

8. The battery according to claim 5, wherein $M^3$ is selected from the group consisting of B, Al, Ga, In and mixtures thereof.

9. The battery according to claim 8, wherein $M^3$ is Al.

10. The battery according to claim 5, wherein $XY_4$ is $PO_4$.

11. The battery according to claim 1, wherein $M^3$ is selected from the group consisting of B, Al, Ga, In and mixtures thereof.

12. The battery according to claim 11, wherein $M^3$ is Al.

13. The battery according to claim 1, wherein $XY_4$ is $PO_4$.

14. The battery according to claim 1, wherein $XY_4$ is $PO_{4-x}F_x$, and $0<x \leq 1$.

15. The battery according to claim 1, wherein the carbonate comprises an alkylene carbonate having a ring size of from 5 to 8 atoms and is unsubstituted or substituted with lower alkyl on one or more carbon atoms.

16. The battery according to claim 15, wherein the alkylene carbonate is selected from the group consisting of ethylene carbonate, 1,3-propylene carbonate, 1,4-butylene carbonate, 1,5-pentylene carbonate, 1,2-propylene carbonate, 2,3-butylene carbonate, 1,2-butylene carbonate, and mixtures thereof.

17. The battery according to claim 1, wherein the carbonate comprises a C1-05 alkyl carbonate which is unsubstituted or substituted with $C_1$-$C_4$ alkyl on one or more carbon atoms.

18. The battery according to claim 17, wherein the alkyl carbonate is selected from the group consisting of diethyl carbonate, ethyl methyl carbonate, dimethyl carbonate, and mixtures thereof.

19. The battery according to claim 17, wherein the cyclic ester has a ring size of from 4 to 7 atoms, and is unsubstituted or substituted on one or more carbon atoms with a lower alkyl group.

20. The battery according to claim 19, wherein the cyclic ester is selected from the group consisting of substituted or unsubstituted 13-propiolactone; substituted or unsubstituted y-butyrolactone, substituted or unsubstituted 8-valerolactone, substituted or unsubstituted e-caprolactone, and mixtures thereof.

21. The battery according to claim 1, wherein the electrolyte salt is a lithium salt selected from the group consisting of $LiAsF_6$, $LiPF_6$, $LiClO_4$, $LiB(C_6H_5)_4$, $LiAlCl_4$, $LiBr$, $LiBF_4$, $LiSO_3CF_3$, $LiN(SO_2CF_3)_2$, $LiN(SO_2C_2F_5)_2$, and mixtures thereof.

22. The battery according to claim 1, wherein the cyclic ester comprises at least about 60% by weight of the electrolyte.

23. The battery of claim 1, wherein the first electrode is a cathode, and the second electrode is an insertion anode.

24. The battery of claim 23, wherein the second electrode comprises a material selected from the group consisting of metal oxides, metal chalcogenides, carbon, graphite, and mixtures thereof.

* * * * *

UNITED STATES PATENT AND TRADEMARK OFFICE
CERTIFICATE OF CORRECTION

PATENT NO. : 8,318,352 B2
APPLICATION NO. : 11/080605
DATED : November 27, 2012
INVENTOR(S) : M. Yazid Saidi, Haitao Huang and James K. Pugh Page 1 of 1

It is certified that error appears in the above-identified patent and that said Letters Patent is hereby corrected as shown below:

In the Specifications:

Column 11 Line 12
Delete "0.95" Insert --0.9--

Column 12 Line 18
Delete "$Li_{0.1}$" Insert --$Li_{1.0}$--

Column 12 Line 36
Delete "$Ni_{0.99}$" Insert --$Ni_{0.09}$--

Signed and Sealed this
Ninth Day of July, 2013

Teresa Stanek Rea
*Acting Director of the United States Patent and Trademark Office*